US 11,748,983 B2

United States Patent
Donoghue et al.

(10) Patent No.: US 11,748,983 B2
(45) Date of Patent: Sep. 5, 2023

(54) IMAGE-BASED PERSONAL PROTECTIVE EQUIPMENT FIT SYSTEM USING WORKER-SPECIFIC FIT TEST IMAGE DATA

(71) Applicant: 3M INNOVATIVE PROPERTIES COMPANY, St. Paul, MN (US)

(72) Inventors: Claire R. Donoghue, Reading (GB); Christopher P. Henderson, Cumbria (GB)

(73) Assignee: 3M Innovative Properties Company, St. Paul, MN (US)

( * ) Notice: Subject to any disclaimer, the term of this patent is extended or adjusted under 35 U.S.C. 154(b) by 199 days.

(21) Appl. No.: 17/250,081

(22) PCT Filed: May 14, 2019

(86) PCT No.: PCT/IB2019/053998
§ 371 (c)(1),
(2) Date: Nov. 20, 2020

(87) PCT Pub. No.: WO2019/224659
PCT Pub. Date: Nov. 28, 2019

(65) Prior Publication Data
US 2021/0142465 A1 May 13, 2021

Related U.S. Application Data

(60) Provisional application No. 62/674,438, filed on May 21, 2018.

(51) Int. Cl.
*G06T 7/73* (2017.01)
*G06V 20/20* (2022.01)
(Continued)

(52) U.S. Cl.
CPC .............. *G06V 20/20* (2022.01); *A62B 27/00* (2013.01); *G06T 7/0002* (2013.01); *G06T 7/74* (2017.01);
(Continued)

(58) Field of Classification Search
CPC ...... G06V 20/52; G06V 10/757; G06V 10/22; G06V 10/40; G06V 10/446; G06V 40/171;
(Continued)

(56) References Cited

U.S. PATENT DOCUMENTS 6,711,293 B1 3/2004 Lowe
7,103,200 B2 * 9/2006 Hillhouse .......... G06V 40/1365
382/209

(Continued)

FOREIGN PATENT DOCUMENTS

EP 2600285 6/2013
EP 2653772 10/2013
(Continued)

OTHER PUBLICATIONS

"Feature Matching", OpenCV-Python Tutorials (Date unknown but believed to be prior to the date of the filing of the present application.), [retrieved from the internet on Feb. 13, 2021], URL < https://docs.opencv.org/3.0-beta/doc/py_tutorials/py_feature2d/py_matcher/py_matcher.html >, 4 pages.
(Continued)

*Primary Examiner* — Ian L Lemieux
(74) *Attorney, Agent, or Firm* — Steven A. Bern

(57) ABSTRACT

Example PPE fit systems are described that verify that a current fit of a PPE on a wearer is consistent with a previous fit test of the PPE on the particular wearer. During a fit test of a PPE, an image capture device captures an image of the wearer with the PPE that represents a verified reference for
(Continued)

a fit of PPE of a same or similar type on the particular wearer. During a verification check, an image capture device captures an image of the wearer with the PPE. Visual features of the fit test image are compared with visual features of the verification image to determine whether the fit of the PPE on the wearer is correct. Differences between the visual features are alerted to the user, such as for correction, adjustment, or retest.

12 Claims, 9 Drawing Sheets

(51) Int. Cl.
*G06T 7/00* (2017.01)
*A62B 27/00* (2006.01)
*G06V 10/75* (2022.01)
*G06V 10/40* (2022.01)

(52) U.S. Cl.
CPC .............. *G06T 7/97* (2017.01); *G06V 10/40* (2022.01); *G06V 10/75* (2022.01); *G06T 2207/30201* (2013.01); *G06T 2207/30204* (2013.01)

(58) Field of Classification Search
CPC ...... G06V 40/172; A61F 9/029; G06K 9/627; G06K 9/6201; A41D 13/11; G06T 2207/30201; G06T 2207/30204; G06T 2219/2004; G06T 7/74; A62B 18/02; A62B 23/025; A62B 27/00; F16P 3/142; G06Q 20/18; G06Q 50/265
See application file for complete search history.

(56) References Cited

U.S. PATENT DOCUMENTS

| | | | |
|---|---|---|---|
| 8,165,401 B2 | 4/2012 | Funayama | |
| 8,208,681 B2 | 6/2012 | Heller | |
| 8,294,580 B2 | 10/2012 | Witwer | |
| 8,456,308 B2 | 6/2013 | Nelson | |
| 8,705,850 B2 * | 4/2014 | Naito | G06V 40/171 |
| | | | 382/209 |
| 8,842,019 B2 | 9/2014 | Boccola | |
| 8,908,928 B1 * | 12/2014 | Hansen | G06V 40/103 |
| | | | 382/199 |
| 9,361,411 B2 | 6/2016 | Thiruvengada | |
| 9,695,981 B2 * | 7/2017 | Au | G06V 10/757 |
| 10,542,332 B2 * | 1/2020 | Awiszus | A62B 99/00 |
| 11,188,781 B2 * | 11/2021 | Yabuuchi | G06V 40/168 |
| 11,263,568 B2 * | 3/2022 | Kanukurthy | G16H 40/67 |
| 11,367,308 B2 * | 6/2022 | Nozue | G06V 10/22 |
| 2003/0203212 A1 | 10/2003 | Wei | |
| 2008/0189142 A1 * | 8/2008 | Brown | G06Q 10/00 |
| | | | 705/325 |
| 2009/0161918 A1 | 6/2009 | Heller | |
| 2009/0232358 A1 | 9/2009 | Cross | |
| 2012/0081214 A1 | 4/2012 | Alan | |
| 2013/0147938 A1 | 6/2013 | McCloskey | |
| 2013/0257622 A1 | 10/2013 | Davalos | |
| 2013/0282609 A1 | 10/2013 | Au | |
| 2014/0253589 A1 | 9/2014 | Tout | |
| 2014/0278320 A1 | 9/2014 | Wang | |
| 2014/0307076 A1 * | 10/2014 | Deutsch | F16P 3/142 |
| | | | 348/77 |
| 2016/0070851 A1 * | 3/2016 | Wang | G06F 30/20 |
| | | | 703/2 |
| 2016/0162604 A1 | 6/2016 | Xiaoli | |
| 2016/0292473 A1 * | 10/2016 | Alan | G06Q 10/087 |
| 2019/0318170 A1 * | 10/2019 | Rokade | H04N 7/181 |

FOREIGN PATENT DOCUMENTS

| | | | | |
|---|---|---|---|---|
| WO | WO 2011-123741 | 10/2011 | | |
| WO | WO 2014-150739 | 9/2014 | | |
| WO | WO-2014150776 A1 * | 9/2014 | .............. | A62B 7/02 |
| WO | WO 2015-050608 | 4/2015 | | |
| WO | WO 2015-195303 | 12/2015 | | |
| WO | WO 2016-111970 | 7/2016 | | |
| WO | WO 2016-118690 | 7/2016 | | |
| WO | WO 2018-151759 | 8/2018 | | |
| WO | WO 2019-064108 | 4/2019 | | |

OTHER PUBLICATIONS

International Search Report for PCT International Application No. PCT/IB2019/053998, dated Sep. 17, 2019, 4 pages.

* cited by examiner

IMAGE-BASED PERSONAL PROTECTIVE EQUIPMENT FIT SYSTEM USING WORKER-SPECIFIC FIT TEST IMAGE DATA

CROSS REFERENCE TO RELATED APPLICATIONS

This application is a national stage filing under 35 U.S.C. 371 of PCT/IB2019/053998, filed May 14, 2019, which claims the benefit of U.S. Provisional Application No. 62/674,438, filed May 21, 2018, the disclosure of which is incorporated by reference in its/their entirety herein.

TECHNICAL FIELD

The present application relates generally to personal protection equipment and, in particular, to personal protection equipment monitoring systems.

BACKGROUND

Personal protective equipment (PPE) is often used to protect a user (e.g., a worker) from harm or injury from a variety of causes in a work environment. For example, fall protection equipment is important safety equipment for workers operating at potentially harmful or even deadly heights. To help ensure safety in the event of a fall, workers often wear safety harnesses connected to support structures with fall protection equipment such as lanyards, energy absorbers, self-retracting lifelines (SRLs), descenders, and the like. As another example, when working in areas where there is known to be, or there is a potential of there being, dusts, fumes, gases or other contaminants that are potentially hazardous or harmful to health, it is usual for a worker to use a respirator or a clean air supply source. While a large variety of respiratory devices are available, some commonly used devices include powered air purifying respirators (PAPR) and a self-contained breathing apparatus (SCBA). Other PPE include those for hearing protection (ear plugs, earmuffs), vision protection (safety spectacles, goggles, welding mask or other face shields), head protection (e.g., visors, hard hats, or the like), and protective clothing.

A worker may periodically undergo a fit test for a PPE in a controlled environment, such as during PPE training or during a government-mandated PPE fit test. For example, the United States Occupational Safety and Health Administration (OSHA) requires under 29 CFR 1910.134 that, before an employee may use a positive or negative pressure tight-fitting facepiece, the employee must be fit tested with the same make, model, style, and size of respirator that will be used. However, due to human error, body changes, and other factors outside an employer's direct control, a worker may not wear the PPE during routine use in the same way as tested during the fit test, leading to a violation of one or more safety requirements.

SUMMARY

In general, this disclosure describes personal protective equipment (PPE) fit systems for verifying PPE fit. Example PPE fit systems are described that verify that a current fit of a PPE on a wearer is consistent with a previous fit test of the PPE on the particular wearer. During a fit test of a PPE, an image capture device captures an image of the wearer with the PPE. This fit test image represents a verified reference for a fit of PPE of a same or similar type on the particular wearer. During routine use, the wearer uses the PPE fit system to visually check the fit of the wearer's PPE against the fit of the fit test of the wearer for the similar type of PPE. During this verification check, an image capture device captures an image of the wearer with the PPE. Visual features of the fit test image are compared with visual features of the verification image to determine whether the fit of the PPE on the wearer is correct. For example, the PPE fit systems may use image processing techniques to parameterize the images of the wearer with the PPE. Differences between the visual features are alerted to the user, such as for correction, adjustment, or retest. The PPE fit systems may also visually check the wearer without the PPE for changes to the wearer that may affect fit, such as facial hair, weight gain, and other features that may not be identified while the wearer is wearing the PPE.

In this way, the PPE fit systems discussed herein may provide technical advantages for verifying PPE fit. For example, the PPE fit systems use customized fit information for the particular wearer of the PPE that may be more accurate than generalized fit information for a generic wearer of the PPE. As another example, the PPE fit systems may provide specific feedback to the wearer, such as adjustments to be made to the fit of the PPE. As yet another example, the PPE fit systems may track changes of the fit of the PPE on the particular wearer, such as by tracking body changes of the particular wearer, so that the wearer can be notified of a recommended update of a fit test of the PPE.

In some examples, a system includes an image capture device and a computing device communicatively coupled to the image capture device. The computing device includes one or more computer processors and a memory. The memory includes instructions that, when executed by the one or more computer processors, cause the one or more computer processors to retrieve first wearer-specific image data from the memory and second wearer-specific image data from the image capture device. The first wearer-specific image data includes a visual representation of a first article of PPE positioned on a particular wearer in a way that satisfies at least one safety requirement. The second wearer-specific image data comprising a visual representation of a second article of PPE positioned on the particular wearer. The second article of PPE is of a same type of personal protection as the first article of PPE. The instructions further cause the one or more computer processors to compare one or more visual features of the second wearer-specific image data to one or more visual features of the first wearer-specific image data and determine, based on the comparison of the one or more visual features of the second wearer-specific image data to the one or more visual features of the first wearer-specific image data, whether the second article of PPE satisfies the at least one safety requirement. The instructions further cause the one or more computer processors to output an indication of whether the second article of PPE satisfies the at least one safety requirement.

In another example, a computing device for determining a fit test is communicatively coupled to an image capture device. The computing device includes one or more computer processors and a memory with instructions that, when executed by the one or more computer processors, cause the one or more computer processors to retrieve first wearer-specific image data from the memory and receive second wearer-specific image data from the image capture device. The first wearer-specific image data comprising a visual representation of a first article of PPE positioned on a particular wearer in a way that satisfies at least one safety requirement. The second wearer-specific image data comprising a visual representation of a second article of PPE positioned on the particular wearer. The second article of PPE is of a same type of personal protection as the first article of PPE. The instructions further cause the one or more computer processors to compare one or more visual features of the second wearer-specific image data to one or more visual features of the first wearer-specific image data and determine, based on the comparison of the one or more visual features of the second wearer-specific image data to the one or more visual features of the first wearer-specific image data, whether the second article of PPE satisfies the at least one safety requirement. The instructions further cause the one or more computer processors to output an indication of whether the second article of PPE satisfies the at least one safety requirement.

In another example, an article, comprising a personal protective equipment (PPE) and a reference marker coupled to the PPE and detectable by an image capture device. The reference marker is indicative of a fit of the PPE on a particular wearer.

The details of one or more examples are set forth in the accompanying drawings and the description below. Other features, objects, and advantages of the disclosure will be apparent from the description and drawings, and from the claims.

DETAILED DESCRIPTION

Figure 1:
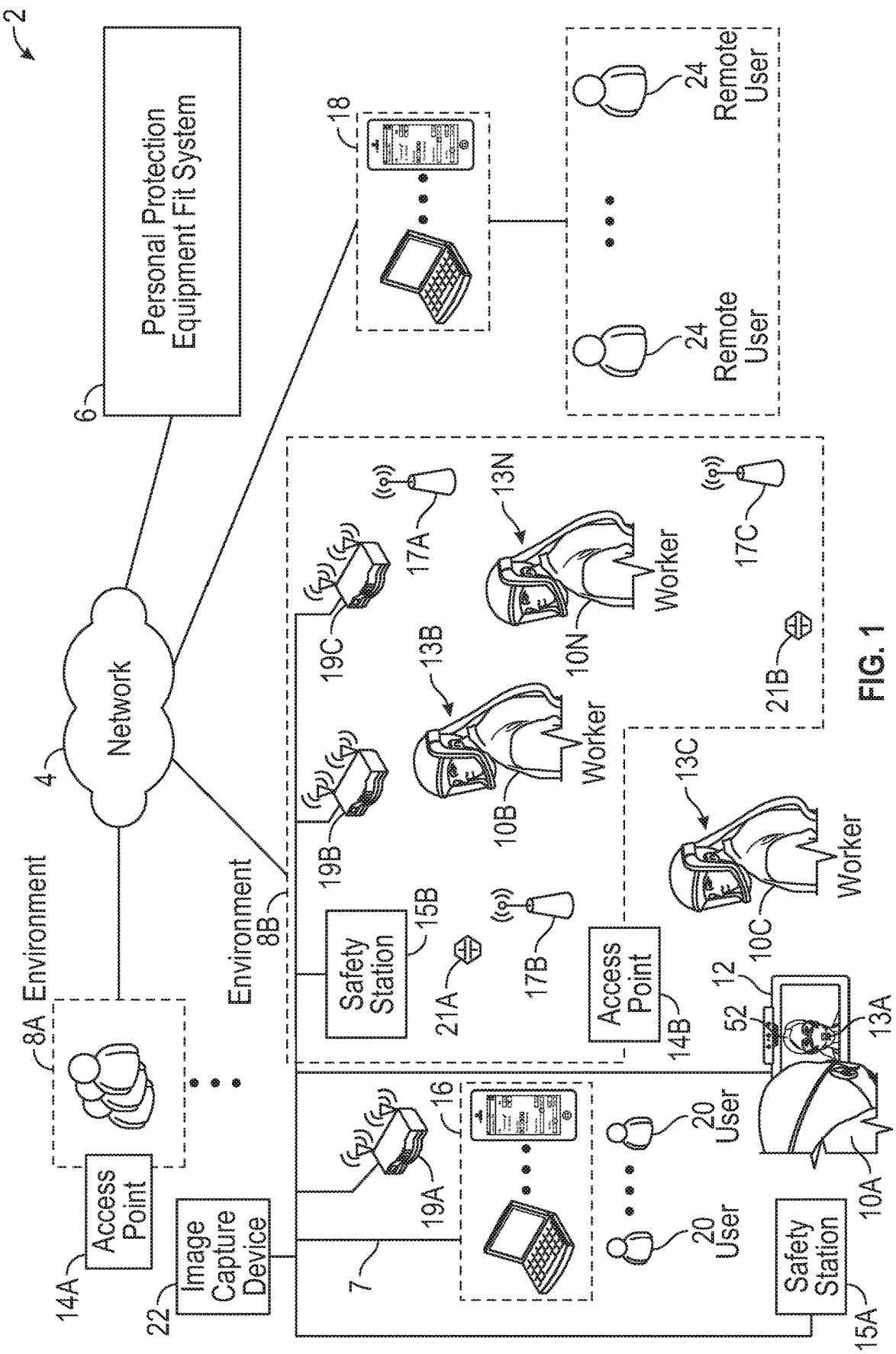
FIG. 1 is a block diagram illustrating an example computing system that includes a personal protection equipment identification system (PPEFS) for identifying and displaying one or more articles of PPE for a worker.

FIG. 1 is a block diagram illustrating an example computing system 2 that includes a personal protection equipment (PPE) fit system (PPEFS) 6 for verifying a fit of one or more articles of PPE 13A-13N (collectively, "articles of PPE 13") for use in a work environment 8A, 8B (collectively, "environments 8"). By interacting with PPEFS 6, workers 10A-10N (collectively, "workers 10") can compare a current fit of one or more articles of PPE 13 to a previous verified fit of the same type of the one or more articles of PPE 13 to verify that the current fit is acceptable and confirm that they are properly prepared to enter environments 8 via an access point 14A or 14B (collectively, "access points 14").

In general, PPEFS 6 may verify a fit of one or more articles of PPE 13 for a worker to use, display the fit or alterations to the fit of the one or more articles of PPE 13, acquire data regarding fit of the one or more articles of PPE, monitor, log compliance, generate reports, provide in depth analytics, and generate alerts. For example, PPEFS 6 may be used to determine that a worker is wearing the article of PPE correctly or incorrectly, that the article of PPE should be adjusted in a particular way, and/or that a worker should undergo a more current fit test of the article of PPE. As further described below, PPEFS 6 provides an integrated suite of PPE fit tools and implements various techniques of this disclosure. That is, PPEFS 6 provides an integrated, end-to-end system for verifying a fit of one or more articles of PPE worn by workers 10 prior to allowing the worker to enter one or more environments 8. In some examples, environments 8 may include construction sites, mining, confined spaces, manufacturing sites, or any physical environment. The techniques of this disclosure may be realized within various parts of system 2.

As shown in the example of FIG. 1, system 2 represents a computing environment in which a computing device 16 at access point 14A or 14B, and/or within or proximate to a plurality of environments 8, may electronically communicate with PPEFS 6 via one or more computer networks 4. Each environment 8 represents a physical environment, such as a work environment, in which one or more individuals, such as workers 10, utilize PPE while engaging in tasks or activities within the respective environment. As shown in FIG. 1, each of the environments 8 may have an access point 14 through which workers 10 gain entrance into the environment 8.

In the example of FIG. 1, environment 8A is shown as generally having workers 10, while environment 8B is shown in expanded form to provide more detail. In the example of FIG. 1, a plurality of workers 10B-10N are shown within environment 8B wearing respective articles of PPE 13B-13N. Worker 10C is shown wearing a respective article of PPE 13C at access point 14B outside of environment 8B. As shown, for example, in FIG. 1, each worker 10 may wear a respirator as an article of PPE 13A-13N. In other examples, workers 10 may use one or more additional or alternative articles of PPE 13. In some cases, one or more articles of PPE 13 may be configured to transmit data from a sensor of the one or more articles of PPE 13 to network 4. For example, one or more articles of PPE 13 may be configured to transmit data relating to the usage, the useful life, the status, or the like of the one or more articles of PPE 13 to a device through network 4.

Each of environments 8 may include computing facilities (e.g., a local area network) by which one or more computing devices 16 at access points 14 and/or within environments 8 are able to communicate with PPEFS 6. For example, access points 14 and/or environments 8 may be configured with wireless technology, such as 802.11 wireless networks, 802.15 ZigBee networks, or the like. In the example of FIG. 1, access point 14B and environment 8B include a local network 7 that provides a packet-based transport medium for communicating with PPEFS 6 via network 4. In addition, access point 14B and/or environment 8B may include a plurality of wireless access points 19A-19C geographically distributed throughout access point 14B and/or environment 8B to provide support for wireless communications both inside and outside of access point 14B and/or work environment 8B.

As shown in the example of FIG. 1, an environment, such as environment 8B, may also include one or more wireless-enabled beacons, such as beacons 17A-17C (collectively, "beacons 17"), that provide accurate location information within the work environment. For example, beacons 17 may be GPS-enabled such that a controller within the respective beacon may be able to precisely determine the position of the respective beacon. In addition, an environment, such as environment 8B, may also include one or more wireless-enabled sensing stations, such as sensing stations 21A and 21B (collectively, "sensing stations 21"). Each sensing station 21 includes one or more sensors and a controller configured to output data indicative of sensed environmental conditions. Moreover, sensing stations 21 may be positioned within respective geographic regions of environment 8B or may otherwise interact with beacons 17 to determine respective positions and may include such positional information when reporting environmental data to PPEFS 6. As such, PPEFS 6 may be configured to correlate the sensed environmental conditions with the particular regions. For example, PPEFS 6 may use the environmental data to aid when generating alerts or other instructions to workers 10 at access point 14B. For instance, PPEFS 6 may use such environmental data to inform workers 10 of environmental conditions he or she may experience upon entrance to work environment 8B. Example environmental conditions that may be sensed by sensing stations 21 include but are not limited to temperature, humidity, presence or absence of a gas, pressure, visibility, wind, or the like.

In some examples, access point 14B and/or environment 8B may also include one or more safety stations 15A, 15B (collectively, "safety stations 15") for accessing one or more articles of PPE 13, such as the respirators shown in FIG. 1. Safety stations 15 may allow workers 10 to check out one or more articles of PPE 13, exchange a size of one or more articles of PPE 13, exchange data, or the like. In some examples, safety stations 15 may transmit alerts, rules, software updates, and/or firmware updates to one or more articles of PPE 13.

In addition, access points 14 and/or environments 8 may include computing facilities that provide an operating environment for computing devices 16 to interact with PPEFS 6 via network 4. A user 20, such as one of the workers 10, may interact with computing devices 16 to access PPEFS 6 to verify a fit of one or more articles of PPE 13. In some examples, computing devices 16 include a display 12 for use with PPEFS 6. Additionally, or alternatively, as shown in FIG. 1, a separate display 12 may be included at access point 14B and coupled to computing devices 16, or directly to PPEFS 6. In any case, computing devices 16 and display 12 (or computing devices 16 including display 12) may be connected to PPEFS 6 via local network 7. Display 12 may be configured to display an alert, indication, visual representation, or other output based on wearer-specific image data of worker 10A. In some examples, display 12 may be an augmented mirror. For example, the augmented mirror may reflect an image of worker 10A with an image, such as a previous image of worker 10A, overlaid on the current image worker 10A.

Similarly, remote users 24 may use computing devices 18 to interact with PPEFS 6 via network 4. For example, access points 14 and/or environments 8 may include one or more safety managers responsible for overseeing safety compliance, such as PPE compliance of workers 10. In some such examples, remote users 24 may be able to access data acquired by PPEFS 6 such as, for example, PPE compliance information, training information, avatars of workers 10, images of workers 10, three-dimensional models of workers and/or PPEs, or any other data available to PPEFS 6 as described herein. Computing devices 16, 18 may include any suitable computing device, such as, for example, laptops, desktop computers, mobile devices, such as tablets and/or smartphones, or the like.

In the example of FIG. 1, system 2 includes image capture device 22. Image capture device 22 is coupled to network 4, such that image capture device 22 is communicatively coupled to PPEFS 6. Image capture device 22 is configured to capture a visual representation of worker 10A and generate wearer-specific image data from the visual representation of worker 10A. In some examples, image capture device 22 may capture a visual representation of one or more articles of PPE 13A positioned on worker 10A and generate wearer-specific image data of the one or more articles of PPE 13A positioned on worker 10A. In some examples, image capture device 22 may capture a visual representation of worker 10A without one or more articles of PPE and generate wearer-specific image data of worker 10A without the one or more articles of PPE.

Wearer-specific image data includes any data or metadata that represents, in any way, a visual representation of either worker 10A or an article of PPE 13A associated with worker 10A. Wearer-specific image data that may be generated by image capture device 22 may include pixel representations, parameterized representations, or any other information that describes, represents, or is associated with the visual representation. PPEFS 6 may be communicatively coupled to image capture device 22 and configured to receive the wearer-specific image data from image capture device 22. For example, image capture device 22 may send the wearer-specific image data to PPEFS 6, such as through network 4.

Image capture device 22 may include a variety of image capture devices. In some examples, image capture device 22 may include a red-green-blue (RGB) camera configured to capture light within a visible spectrum. In some examples, image capture device 22 may include a flash. For example, as will be described in FIG. 6, various spectral shift markers may be placed on or in an article of PPE, such that a contour of the article of PPE may be captured by an emission of the flash and corresponding detection of a spectral shift based on incidence and reflection of the emission. In some examples, image capture device 22 may be a hyperspectral camera. For example, the hyperspectral camera may be a light-sensitive imaging device that collects information from across an electromagnetic spectrum, such as outside the visible light spectrum. In some examples, image capture device 22 is configured to capture near-infrared (NIR) radiation, such that the NIR radiation detected by image capture device 22 may not be detected by an unaided human eye. In some examples, image capture device 22 may be a charge-coupled device (CCD). For example, the CCD may be a light-sensitive image device that includes a large-scale integrated circuit containing a large number, such as hundreds of thousands, of photo-sites (i.e. pixels) that convert light energy into a limit number of electric signals, such as between about 10 and about 100 electric signals. In some examples, image capture device 22 may be a depth camera.

For example, the depth camera may be configured to receive image data that includes information along an x-axis (i.e. a width), a y-axis (i.e. a height), and a z-axis (i.e. a depth). A variety of depth cameras may be used including, but not limited to, REALSENSE Depth camera (available from Intel).

In some examples, image capture device 22 may include more than one image capture device. Article of PPE 13A may include various physical features that may be captured better (i.e. more efficiently, cheaply, accurately, etc.) by different image capture devices. For example, for a respirator positioned on a face of worker 10A, a depth camera may capture a contour of the respirator on the wearer's face or indentations on the wearer's face caused by the respirator, an RGB camera may capture an outline of the respirator on the wearer's face, a flash may enable capture of a contour of a spectral shift nose clip or band of the respirator, and an NIR camera may capture a reference NIR tag on the respirator. In some examples, image capture device 22 may include other circuitry or software that processes the wearer-specific image data, such as parameterization or compression logic or software.

To ensure that article of PPE 13A adequately fits worker 10A, worker 10A may undergo a fit-testing process (referred to herein as a "fit test"), such as before wearing article of PPE 13A in environment 8 or periodically to meet a safety requirement. During a fit test, image capture device 22 captures a visual representation of worker 10A wearing article of PPE 13A, generates wearer-specific image data of worker 10A wearing article of PPE 13A from the visual representation, and sends the wearer-specific image data to PPEFS 6. The wearer-specific image data represents a visual representation of an article of PPE 13A positioned on a body part of worker 10A. The wearer-specific image data generated during the fit test represents a fit of the article of PPE 13A to the body part of worker 10A that satisfies certain safety requirements associated with the article of PPE 13A. For example, worker 10A may be supervised and receive feedback during the fit test to ensure a fit of the article of PPE 13A on worker 10A that satisfies the safety requirements. Safety requirements may include, for example, a tightness of an article of PPE, a position of an article of PPE, an orientation of an article of PPE, and other fit properties of the article of PPE associated with effectiveness of the article of PPE. By capturing wearer-specific image data during the fit test, PPEFS 6 creates a personalized visual reference of a verified fit of an article of PPE 13A for worker 10A. As will be explained further below, this personalized visual reference may be used to visually evaluate subsequent fit verifications that may not be performed in such controlled environments as the fit test.

PPEFS 6 may receive the wearer-specific image data from image capture device 22 and store (e.g., in a memory), in association with an identifier of worker 10A, the wearer-specific image data. For example, PPEFS 6 may include a memory or log that stores the wearer-specific image data of the article of PPE 13A on worker 10A. The wearer-specific image data may be associated with the particle article of PPE 13A or type of article of PPE 13A. For example, an article of PPE may have a particular fit type, such that a particular wearer who is fit-tested with the particular type of article of PPE may be verified to wear another of the same type of article of PPE, including a different instance or model of the article of PPE. In some examples, the wearer-specific image data for the fit test may be stored in a centralized database, such that the wearer-specific image data of the fit-test may provide reference wearer-specific image data accessible at any of safety stations 15 or other access points coupled to network 4. In this way, the wearer-specific image data for the fit test may be available for retrieval during other tests, such as a fit verification described below.

Before entering work environment 8A, worker 10A may undergo a fit-verification process (referred to herein as a "fit verification") to ensure that the article of PPE 13A is positioned correctly on worker 10A. This fit verification may occur, for example, at a computing device 16 at an access point. During the fit verification, PPEFS 6 may verify a fit of an article of PPE 13A worn by worker 10A by comparing a current fit of the article of PPE 13A to the previous fit of the article of PPE 13A verified during the fit test. PPEFS 6 may receive, from image capture device 22, the wearer-specific image data for the fit verification. The wearer-specific image data includes a visual representation of the article of PPE 13A positioned on the body part of worker 10A during the fit verification. The article of PPE 13A may be a same type of the article of PPE 13A worn by worker 10A during the fit test. PPEFS 6 may also retrieve, such as from a database, the wearer-specific image data for the fit test.

To determine whether worker 10A is wearing the article of PPE 13A properly, PPEFS 6 may compare the wearer-specific image data obtained during the fit test with the wearer-specific image data obtained during the fit verification. PPEFS 6 may process the wearer-specific image data from the fit test and the fit verification to perform a comparison of one or more visual features of the wearer-specific image data from the fit test and from the fit verification. Visual features of wearer-specific image data may include any portion of the wearer-specific image data that represents physical features of either worker 10A or article of PPE 13A. For example, a visual feature may be a shape of the article of PPE, the contour of the article of PPE, a shape or contour of a portion of the article of PPE, a shape of a face of worker 10A, and the like. In some examples, the visual features of the wearer-specific image data may be visual features for which a difference in visual features may indicate an improper fit. For example, differences in shading caused by differing crease patterns in a flat-folding respirator between a fit test and a fit verification may not indicate an improper fit, as crease patterns may be unrelated to fit of the respirator. However, a difference in position of the flat-folding respirator between the fit test and fit verification may indicate an improper fit, as a position of the respirator may be closely related to the fit of the respirator.

In some examples, PPEFS 6 may use image processing techniques to identify the visual features of the wearer-specific image data and parameterize the visual features. For example, PPEFS 6 may identify portions of the wearer-specific image data that correspond to visual features of the visual representation, such as by analyzing characteristics of the wearer-specific image data. PPEFS 6 may generate, based on the one or more visual features of the wearer-specific image data, a set of parameters for the visual features. The set of parameters may represent a parameterized metric of the visual features of the wearer-specific image data.

PPEFS 6 may determine, based on the comparison of the visual features of the wearer-specific image data of the fit test and fit verification, whether a fit of the article of PPE 13A in the fit verification does not satisfy at least one safety requirement. For example, a safety requirement may correspond to a threshold of a difference between the visual features of the wearer-specific image data of the fit test and fit verification. If the differences between the visual features exceed the threshold, PPEFS 6 may determine that the fit of the article of PPE 13A does not satisfy a safety requirement and output an indication that the fit of article of PPE 13A is not adequate.

In some examples, PPEFS 6 may configure an interface to perform at least one operation in response to the determination of whether the fit of article of PPE 13A to the body part does not satisfy the at least one safety requirement. For example, PPEFS 6 may configure an interface to output to display 12. As another example, PPEFS 6 may configure an interface to output to an audio device In some examples, the at least one operation includes outputting an indication to the wearer to adjust article of PPE 13A. For example, PPEFS 6 may determine an adjustment of article of PPE 13A based on the difference between the wearer-specific image data of the fit test and the fit verification. The adjustment may be configured such that the wearer, following the adjustment, may reposition article of PPE 13A on the body part of worker 10A such that the fit of article of PPE 13A satisfies the safety requirements. In some examples, the indication to worker 10A to adjust article of PPE 13A includes a visual representation of an adjustment to article of PPE 13A to satisfy the at least one safety requirement. For example, as further shown in FIGS. 3B-3D, PPEFS 6 may display, such as on display 12, a visual indication of any of a difference of a visual feature between the wearer-specific image data of the fit test and fit verification, an adjustment of article of PPE 13A, a placement of article of PPE 13A that would satisfy a safety requirement, and the like.

In some examples, worker 10A may undergo a fit-evaluation process (referred to herein as a "fit evaluation") to test for changes in body parts that may affect fit of the article of PPE. A wearer's body may change over time, such that a wearer may undergo another fit test for the article of PPE to ensure a fit of the article of PPE is adequate, to update a fit of the article of PPE, or to update the article of PPE (i.e. a type of the article of PPE) for the changes of worker 10A. For example, worker 10A may grow facial hair or gain weight, such that a respirator may no longer fit properly. Changes may include, but are not limited to, facial hair, scarring, weight gain, gait changes, or other changes that may affect a surface, shape, or movement of a body part.

During the fit test of worker 10A for the article of PPE 13A, PPEFS 6 may receive, from the image capture device, wearer-specific image data for worker 10A without the article of PPE 13A. The wearer-specific image data without the article of PPE 13A may include a visual representation of the body part of the particular wearer at a first time of the fit test. This wearer-specific image data may represent a reference for the body part for which the article of PPE 13A is to be positioned. PPEFS 6 may store, in association with the identifier of the particular wearer, the wearer-specific image data of worker 10A without article of PPE 13A at the time of the fit test.

During a fit-evaluation process of worker 10A, PPEFS 6 may receive, from image capture device 22, wearer-specific image data of worker 10A without article of PPE 13A at the time of the fit-evaluation process. The wearer-specific image data may include a visual representation of the body part of worker 10A at a second time of the fit-evaluation process. PPEFS 6 may compare visual features of the wearer-specific image data without article of PPE 13A from the first time of the fit test and the second time, later than the first time, of the fit verification. Visual features of the wearer-specific image data without article of PPE 13A may include visual features of the shape, surface, or other characteristics of worker 10A that may affect a fit of article of PPE 13A.

PPEFS 6 may determine, based on the comparison of visual features of the wearer-specific image data, whether the worker 10A should undergo another fit test for article of PPE 13A.

By using wearer-specific image data to verify a fit of article of PPE 13A on worker 10A, system 2 may more accurately assess fit than a fit verification system that does not used wearer-specific image data.

In some examples, PPEFS 6 integrates a processing platform configured to process thousand or even millions of concurrent streams of PPE compliance and/or verification information from one or more access points 14. An underlying analytics engine of PPEFS 6 may apply historical data and models to the inbound streams to compute confidence levels, identify trends or patterns, apply machine learning algorithms, or the like. PPEFS 6 may also be configured to process streams of information relating to environments 8, such as, for example, environmental conditions and/or safety events of environments 8. Further, PPEFS 6 may provide real-time alerting and reporting to notify workers 10 and/or users 20, 24 of any compliance errors, verification information, low confidence levels, anomalous conditions of environments 8, or the like.

In this way, PPEFS 6 tightly integrates comprehensive tools for managing PPE compliance with an underlying analytics engine and communication system to provide data acquisition, monitoring, activity logging, reporting, behavior analytics, and/or alert generation. Moreover, PPEFS 6 provides a communication system for operation and utilization by and between the various elements of system 2. Users 20, 24 may access PPEFS to view results on any analytics performed by PPEFS 6 on data acquired from workers 10, image capture device 22, and/or another component as described herein. In some examples, PPEFS 6 may present a web-based interface via a web server (e.g., an HTTP server) or client-side applications may be deployed for devices of computing devices 16, 18 used by users 20, 24, such as desktop computers, laptop computers, mobile devices, such as smartphones and tablets, or the like.

In some examples, PPEFS 6 may provide a datastore query engine for directly querying PPEFS 6 to view acquired information, such as compliance information, and any results of the analytic engine, e.g., by the way of dashboards, alert notifications, reports, or the like. That is, users 20, 24, or software executing on computing devices 16, 18, may submit queries to PPEFS 6 and receive data corresponding to the queries for presentation in the form of one or more reports or dashboards. Such dashboards may provide various insights regarding system 2, such as compliance of workers 10, auditing information, images of workers 10, preparedness of workers 10, or the like.

PPEFS 6 may simplify workflows for individuals charged with monitoring and ensure safety compliance for an entity or environment by putting worker 10A in control of his or her own PPE compliance. That is, the techniques of this disclosure may enable worker 10A to take preventative or corrective actions with respect to PPE compliance on his or her own accord rather than relying on another individual directly monitoring and/or verifying the PPE compliance of worker 10A at access point 14B. PPEFS 6 may also enable users 20, 24 to access data and information relating to the PPE compliance and/or preparedness of workers 10.

As one example, the underlying analytical engine of PPEFS 6 may be configured to compute and present customer-defined metrics for worker populations that interact with access point 14B and/or across multiple access points 14 or environments 8 for an organization as a whole. For example, PPEFS 6 may be configured to acquire data and provide aggregated compliance metrics and predicted behavior analytics across a worker population (e.g., across workers 10 of access points 14 and/or environments 8). Furthermore, users 20, 24 may set benchmarks for occurrence of any PPE non-compliance, and PPEFS 6 may track actual compliance metrics relative to the benchmarks for individuals or defined worker populations.

As another example, PPEFS 6 may trigger an alert if one or more PPE non-compliant metrics are detected. In this manner, PPEFS 6 may identify individual workers 10 for which the metrics do not meet the benchmarks and prompt users 20, 24 to intervene and/or perform procedures to improve the metrics relative to the benchmarks, thereby ensuring PPE compliance and actively managing safety of workers 10.

Figure 2:
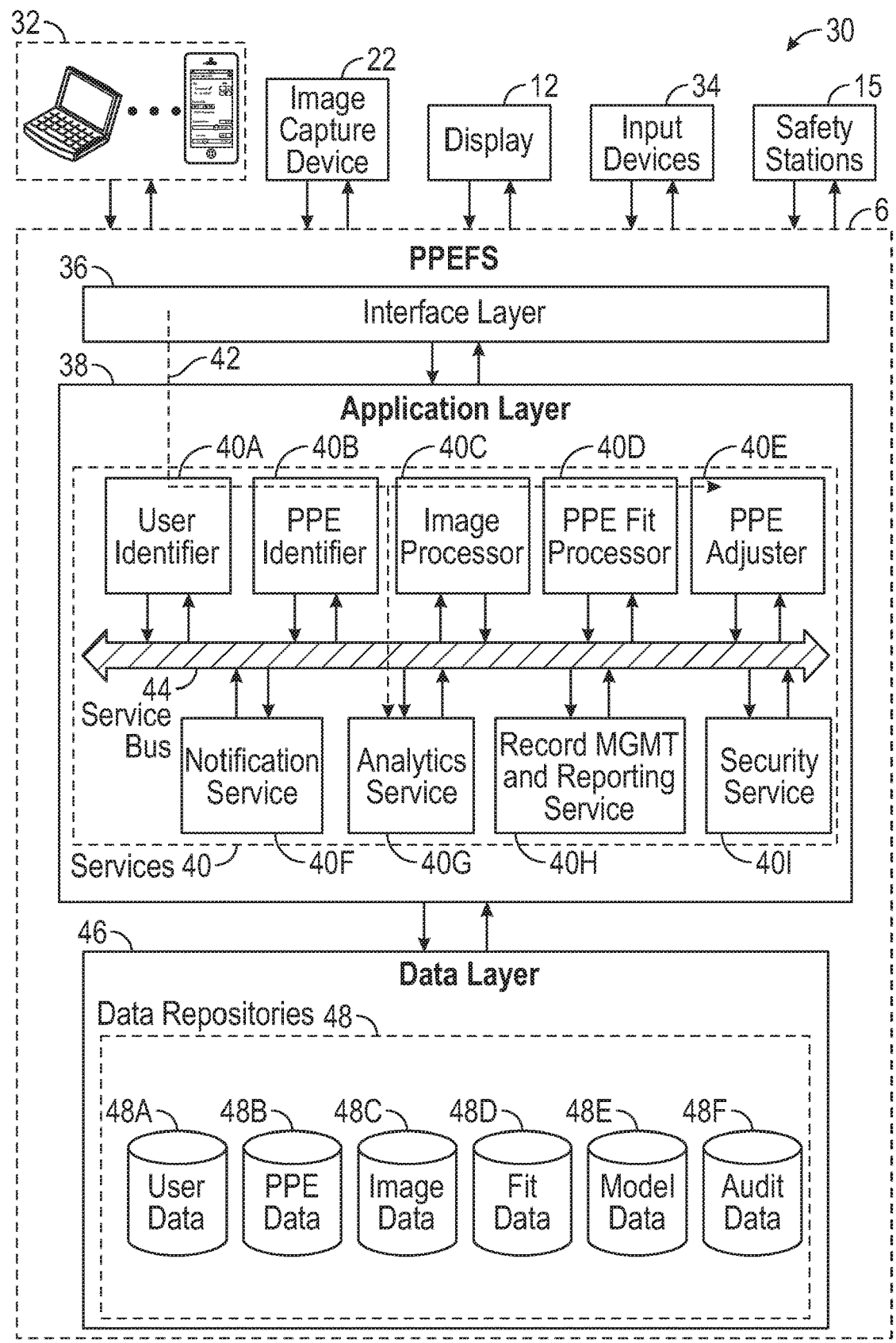
FIG. 2 is a block diagram providing an operating perspective of PPEFS when hosted as a cloud-based platform capable of supporting multiple, distinct access points and/or work environments having an overall population of workers that are required to wear one or more articles of PPE.

FIG. 2 is a block diagram providing an operating perspective of PPEFS 6 when hosted as a cloud-based platform capable of supporting multiple, distinct access points 14 and/or work environments 8 having an overall population of workers 10 that are required to wear one or more articles of PPE. In the example of FIG. 2, the components of PPEFS 6 are arranged according to multiple logical layers that implement the techniques of the disclosure. Each layer may be implemented by one or more modules and may include hardware, software, or a combination of hardware and software.

In some example approaches, computing devices 32, display 12, input devices 34, and/or safety stations 15 operate as clients 30 that communicate with PPEFS 6 via interface layer 36. Computing devices 32 typically execute client software applications, such as desktop applications, mobile applications, and/or web applications. Computing devices 32 may represent any of computing devices 16, 18 of FIG. 1. Examples of computing devices 32 may include, but are not limited to, a portable or mobile computing device (e.g., smartphone, wearable computing device, tablet), laptop computers, desktop computers, smart television platforms, and/or servers.

In some example approaches, computing devices 32, display 12, image capture devices (e.g., cameras) 22, input devices 34 and/or safety stations 15 may communicate with PPEFS 6 to send and receive information related to PPE fit testing, PPE fit verification, alert generation, or the like. Client applications executing on computing devices 32 may communicate with PPEFS 6 to send and receive information that is retrieved, stored, generated, and/or otherwise processed by services 40. For example, the client applications may request and edit PPE fit information, PPE compliance information, PPE training and/or sizing information, or any other information described herein including analytical data stored at and/or managed by PPEFS 6. In some examples, client applications may request and display information received or generated by PPEFS 6, such as a visual representation of an article of PPE 13A positioned on worker 10A, a visual indication of a difference between one or more visual features of wearer-specific image data, and the like. In addition, the client applications may interact with PPEFS 6 to query for analytics information about PPE compliance, behavior trends of workers 10, audit information, or the like. The client applications may output for display information received from PPEFS 6 to visualize such information for users of clients 30. As further illustrated and described below, PPEFS 6 may provide information to the client applications, which the client applications output for display in user interfaces.

Client applications executing on computing devices 32 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEFS 6. In the example of a web application, PPEFS 6 may receive requests from the web application (e.g., the web browser), process the requests, and send one or more responses back to the web application. In this way, the collection of web pages, the client-side processing web application, and the server-side processing performed by PPEFS 6 collectively provides the functionality to perform techniques of this disclosure. In this way, client applications use various services of PPEFS 6 in accordance with techniques of this disclosure, and the applications may operate within different computing environments (e.g., a desktop operating system, mobile operating system, web browser, or one or more computer processors or processing circuitry, to name only a few examples).

As shown in FIG. 2, in some example approaches, PPEFS 6 includes an interface layer 36 that represents a set of application programming interfaces (API) or protocol interface presented and supported by PPEFS 6. Interface layer 36 initially receives messages from any of clients 30 for further processing at PPEFS 6. Interface layer 36 may therefore provide one or more interfaces that are available to client applications executing on clients 30. In some examples, the interfaces may be application programming interfaces (APIs) that are accessible over network 4. In some example approaches, interface layer 36 may be implemented with one or more web servers. The one or more web servers may receive incoming requests, may process, and/or may forward information from the requests to services 40, and may provide one or more responses, based on information received from services 40, to the client application that initially sent the request. In some examples, the one or more web servers that implement interface layer 36 may include a runtime environment to deploy program logic that provides the one or more interfaces. As further described below, each service may provide a group of one or more interfaces that are accessible via interface layer 36.

In some examples, interface layer 36 may provide Representational State Transfer (RESTful) interfaces that use HTTP methods to interact with services and manipulate resources of PPEFS 6. In such examples, services 40 may generate JavaScript Object Notation (JSON) messages that interface layer 36 sends back to the client application that submitted the initial request. In some examples, interface layer 36 provides web services using Simple Object Access Protocol (SOAP) to process requests from client applications. In still other examples, interface layer 36 may use Remote Procedure Calls (RPC) to process requests from clients 30. Upon receiving a request from a client application to use one or more services 40, interface layer 36 sends the information to application layer 38, which includes services 40.

As shown in FIG. 2, PPEFS 6 also includes an application layer 38 that represents a collection of services for implementing much of the underlying operations of PPEFS 6. Application layer 38 receives information included in requests received from client applications that are forwarded by interface layer 36 and processes the information received according to one or more of services 40 invoked by the requests. Application layer 38 may be implemented as one or more discrete software services executing on one or more application servers, e.g., physical or virtual machines. That is, the application servers provide runtime environments for execution of services 40. In some examples, the functionality of interface layer 36 as described above and the functionality of application layer 38 may be implemented at the same server.

Application layer 38 may include one or more separate software services 40 (e.g., processes) that may communicate via, for example, a logical service bus 44. Service bus 44 generally represents a logical interconnection or set of interfaces that allows different services to send messages to other services, such as by a publish/subscription communication model. For example, each of services 40 may subscribe to specific types of messages based on criteria set for the respective service. When a service publishes a message of a particular type on service bus 44, other services that subscribe to messages of that type will receive the message. In this way, each of services 40 may communicate information to one another. As another example, services 40 may communicate in point-to-point fashion using sockets or other communication mechanism. Before describing the functionality of each of services 40, the layers are briefly described herein.

Data layer 46 of PPEFS 6 includes one or more datastores 48. A datastore, generally, may be any data structure or software that stores and/or manages data; a datastore may store data in structured or unstructured form. For example, a datastore may be a remote datastore hosted by one or more remote compute servers coupled to the controller by a packet-switched network. As another example, the datastore may be locally cached within a computer-readable medium of the computing device Example datastores include but are not limited to one or more of database management systems, online analytical processing database, map, table, hash tables, or any other suitable structure for storing data. In one example approach, data layer 46 of PPEFS 6 includes datastores 48 used to provide persistence for information in PPEFS 6. Data layer 46 may be implemented, for instance, using Relational Database Management System (RDBMS) software to manage information in datastores 48. The RDBMS software may manage one or more datastores 48, which may be accessed using Structured Query Language (SQL). Information in the one or more databases may be stored, retrieved, and modified using the RDBMS software. In some examples, data layer 46 may be implemented using an Object Database Management System (ODBMS), Online Analytical Processing (OLAP) database, or any other suitable data management system.

As shown in FIG. 2, each of services 40A-40I is implemented in a modular form within PPEFS 6. Although shown as separate modules for each service, in some examples the functionality of two or more services may be combined into a single module or component. Each of services 40 may be implemented in software, hardware, or a combination of hardware and software. Moreover, services 40 may be implemented as standalone devices, separate virtual machines or containers, processes, threads, or software instructions generally for execution on one or more computer processors or processing circuitry.

In some examples, one or more of services 40 may each provide one or more interfaces 42 that are exposed through interface layer 36. Accordingly, client applications of computing devices 32 may call one or more interfaces 42 of one or more of services 40 to perform techniques of this disclosure.

In some cases, services 40 include a user identifier service 40A used to identify a worker 10A at access point 14B. For example, user identifier service 40A may receive identification information from a client 30, such as an input device 34, and may read information stored in user datastore 48A to identify worker 10A based on the identification information. In some examples, user datastore 48A may include identification information including at least one of what worker 10A knows (e.g., an identification number password or username), what worker 10A has (e.g., an identity card or token) and what the user is (a physical characteristic of worker 10A such as biometric information, photo recognition information, or voice recognition information of worker 10A). User identifier service 40A may receive at least one of such identification information, and may read user datastore 48A to identify worker 10A based on the received identification information.

In some examples, user identifier service 40A may process the received identification information to include identification information in the same form as the identification information stored in user datastore 48A. For example, user identifier service 40A may analyze an image, a retina, a fingerprint, and/or a voice recording of worker 10A to extract data and/or information from the identification information that is included in user datastore 48A. As one example, user identifier 40A may extract data representative of a pattern of a fingerprint of worker 10A to compare to data stored in user datastore 48A.

PPE identifier 40B identifies the one or more articles of PPE 13A worn by worker 10A. For example, as described herein, PPE identifier 40B may identify the one or more articles of PPE 13A worn by worker 10A based on an identity of worker 10A, such as based on a job function of worker 10A, environment 8B, based on one or more articles of PPE that worker 10A is trained to use, based on one or more previously worn articles of PPE (e.g., one or more of articles of PPE previously worn by worker 10A, previously worn within environment 8B, previously worn for a specific job function), based in inputs provided by worker 10A, or the like. PPE identifier 40B may read such information from PPE datastore 48B. For example, PPE datastore 48B may include data relating to PPE required or recommended for various job functions, PPE required or recommended for various environments 8, articles of PPE that various workers 10 have been trained to use, and/or PPE previously worn for a job function, in an environment 8, or by a worker 10A. PPE datastore 48B may also include information pertaining to various sizes of one or more articles of PPE for workers 10. For example, PPE datastore 48B may include the brand, model, and/or size of one or more articles of PPE for workers 10 based on fit testing of workers 10. In some examples, in addition to, or as an alternative to, PPE datastore 48B, user datastore 48A may include information regarding a job function of worker 10A, environment 8B within which worker 10A is to work, PPE previously worn by worker 10A, fit testing data of worker 10A, or the like.

Image processor 40C processes wearer-specific image data by performing a comparison of visual features of two or more sets of wearer-specific image data, such as by determining differences in visual features between the two or more sets of wearer-specific image data. Wearer-specific image data includes any data or metadata that represents a visual representation of worker 10A and/or article of PPE 13A. In some examples, such as during a fit test or fit verification, wearer-specific image data includes a visual representation of article of PPE 13A positioned on a body part of a particular wearer. In some examples, such as during a fit evaluation verifying whether a body part of a particular wearer has changed, wearer-specific image data includes a visual representation of a body part of the particular wearer. Visual features of wearer-specific image data may include any portion of the wearer-specific image data that represents properties, such as a position, shape, color, etc., of physical features of worker 10A and/or article of PPE 13A. For example, a visual feature may include a shape of article of PPE 13A, a contour of article of PPE 13A, a shape or contour of a portion of article of PPE 13A, a shape of a body part of worker 10A, and the like.

Image processor 40C may receive wearer-specific image data from a variety of sources. For example, image processor 40C may receive wearer-specific image data from any of image capture device 22, image datastore 48C, or an external device, such as a remote device through a network. In some examples, image processor 40C receives raw (i.e. unprocessed or minimally processed) wearer-specific image data from an image capture device, such as image capture device 22. For example, image processor 40C may receive raw image data from image capture device 22 that represents a visual representation of worker 10A. In some examples, image processor 40C receives wearer-specific image data from a datastore, such as image datastore 48C. For example, in response to receiving an identifier of a particular wearer, image processor 40C may query image datastore 48C for image data associated with the worker 10A. In response to the query, image processor 40C may receive the image data associated with worker 10A from image datastore 48C that represents a visual representation of worker 10A.

In some examples, image processor 40C may process two sets of wearer-specific image data by directly comparing the two sets of wearer-specific image data to determine any differences between the two sets of wearer-specific image data. For example, image processor 40C may receive wearer-specific image data from a fit test and wearer-specific image data from a fit verification, and perform image subtraction between the two sets of wearer-specific image data to identify portions of wearer-specific image data that have changed in the fit verification. The changed portions of the wearer-specific image data may represent the difference in visual features between the two sets of wearer-specific image data.

In some examples, image processor 40C may identify, such as through feature extraction, categorization, and/or parameterization, visual features from each of the two sets of wearer specific image data before comparing the visual features. For example, wearer-specific image data from a fit test may have been captured under different conditions (i.e. lighting, resolution, etc.) than wearer-specific image data from a fit verification, such that direct comparison of the image data may not be feasible. Image processor 40C may identify visual features of the wearer-specific image data by determining portions of wearer-specific image data that correspond to physical features of worker 10A and/or article of PPE 13A and determining characteristics of those portions.

In some examples, article of PPE 13A may include reference markers or other coded information, such that image processor 40C may identify visual features of the wearer-specific image data by identifying properties, such as position or color, associated with the reference markers. For example, image processor 40C may analyze the wearer-specific image data to detect a particular pattern associated with the reference marker. Image processor 40C may extract characteristics of article of PPE 13A from the detected reference marker, such as a position of article of PPE 13A or a portion of article of PPE 13A (i.e. straps of respirator).

In some examples, image processor 40C may identify visual features of the wearer-specific image data by identifying characteristics of the wearer-specific image data that correspond to characteristics of the physical features of worker 10A and/or article of PPE 13A. Characteristics of the wearer-specific image data that correspond to characteristics of the physical features may include, but are not limited to, edges, lines, shading, Haar-like features, and the like. For example, image processor 40C may identify an edge of article of PPE 13A by detecting changes in contrast levels between pixels corresponding to article of PPE 13A and pixels that do not correspond to article of PPE 13A. Image processor 40C may extract characteristics of article of PPE 13A from the identified edge of article of PPE 13A, such as a position of the edge. In some examples, image processor 40C may further identify objects of article of PPE 13A and/or worker 10A, such as components of article of PPE 13A or body parts of worker 10A, and extract characteristics of the identified object. For example, image processor 40C may group edges to form a region. Based on certain characteristics of the region, such as shape or position, image processor 40C may identify the region as representing a portion of article of PPE 13A, such as a nose clip. In this example, image processor 40C may extract certain visual features from the region representing the nose clip, such as a curvature or position of the nose clip.

In some examples, image processor 40C may parameterize the visual features of the wearer-specific image data, such as by generating a set of parameters that represents visual features of the wearer-specific image data. For example, image processor 40C may generate a set of parameters representing a position of article of PPE 13A from positions of pixels representing a visual feature, such as a boundary, of article of PPE 13A. Image processor 40C may store the parameters in a datastore, such as image datastore 48C. The parameters may represent a summary, measurement, or other metric of Once visual features have been identified, image processor 40C may compare the visual features of two sets of wearer-specific image data to perform a comparison of the visual features of the two sets of wearer-specific image data. As explained above, visual features of wearer-specific image data may be represented in a variety of forms, including pixel representations, parameterized representations, and the like. Image processor 40C may compare values of the visual features of two sets of wearer-specific image data to determine differences between the visual features. For example, in examples where the visual features of the two sets of wearer-specific image data are parameterized, image processor 40C may compare the two sets of parameters.

Image processor 40C stores wearer-specific image data. Stored wearer-specific image data may include wearer-specific image data in any stage of receipt or processing, including wearer-specific image data from image capture device 22, a portion of wearer-specific image data corresponding to one or more visual features, parameters corresponding to one or more visual features, differences between visual features of one or more sets of wearer-specific image data, and the like. For example, image processor 40C may receive wearer-specific image data from, for example, image capture device 22 or an external datastore, and store the wearer specific image data in association with an identifier of the particular wearer, such as in image datastore 48C.

PPE fit verifier 40D determines whether a fit of article of PPE 13A from a fit verification satisfies one or more safety requirements based on a comparison of visual features of wearer-specific image data from a fit test and wearer-specific image data from a fit verification. For example, PPE fit verifier 40D may determine whether a fit of article of PPE 13A worn by worker 10A satisfies one or more safety requirements based on a comparison of visual features of wearer-specific image data from a fit test and wearer-specific image data from a fit verification.

PPE fit verifier 40D may receive a comparison of visual features of two sets of wearer-specific image data. For example, PPE fit verifier 40D may receive a comparison of visual features between wearer-specific image data from a fit test and wearer-specific image data from a fit verification. The comparison of visual features may include one or more differences between visual features of two sets of wearer-specific image data. In some examples, PPE fit verifier 40D may receive the comparison of the visual features from image processor 40C, such as during a fit verification. In some examples, PPE fit verifier 40D may receive the comparison of the visual features from image datastore 48C, such as during a fit audit.

In some examples, PPE fit verifier 40D may receive PPE fit data from PPE fit datastore 48D. PPE fit data includes any data related to a fit of article of PPE 13A. For example, PPE fit data may include data, parameters, thresholds, or other information related to fit-related safety requirements of article of PPE 13A. In some examples, PPE fit verifier 40D receives fit data that represents one or more safety requirements of article of PPE 13A. For example, the fit data may include thresholds that correspond to a maximum difference between visual features of wearer-specific image data.

PPE fit verifier 40D determines whether a fit of article of PPE 13A satisfies at least one safety requirement based on the comparison of the visual features of two sets of wearer-specific image data. For example, PPE fit verifier 40D may determine whether a fit of article of PPE 13A satisfies at least one safety requirement based on a comparison of visual features of wearer-specific image data from a fit test and wearer-specific image data from a fit verification. In some examples, PPE fit verifier 40D may compare one or more differences from the comparison of the visual features of the two sets of wearer-specific image data to one or more thresholds representing one or more safety requirements. For example, a safety requirement may be associated with a range of fits of article of PPE 13A. The range of fits may be defined by a threshold, such that if a fit of article of PPE 13A is outside the threshold, the fit of article of PPE 13A does not meet the safety requirement. Thresholds that may be used include, but are not limited to: an absolute position of a portion of article of PPE 13A, such as a position along an x-axis and y-axis of the visual representation captured by the image data; a relative position of article of PPE 13A, such as a distance between two components of article of PPE 13A; an orientation of features of article of PPE 13A, such as an angle or position of a feature of article of PPE 13A; a presence or absence of a feature of article of PPE 13A, such as an indicator or reference of article of PPE 13A; a color value of a portion of article of PPE 13A, such as a color value associated with a contour or tension of a portion of article of PPE 13A; and the like.

In some instances, PPE fit verifier 40D may determine that a fit of article of PPE 13A satisfies various safety requirements. For example, PPE fit verified 40D may determine that the one or more differences between a comparison of visual features between wearer-specific image data of a fist test and fit verification do not exceed one or more thresholds representing one or more safety requirements. In this instance, PPE fit verifier 40D may output an indication, such as to notification service 40F or display 12, that the fit of article of PPE 13A satisfies the various safety requirements.

In some instances, PPE fit verifier 40D may determine that a fit of article of PPE 13A does not satisfy various safety requirements. For example, PPE fit verifier 40D may determine that at least one of the one or more differences between a comparison of visual features between wearer-specific image data of a fit test and fit verification exceeds a threshold representing one or more safety requirements. In this instance, PPE fit verifier 40D may output an indication that the fit of article of PPE 13A does not satisfy at least one of the various safety requirements. For example, PPE fit verifier 40D may output the indication to notification service 40F or display 12.

In some examples, PPE fit verifier 40D may include an interface configured to perform at least one operation in response to the determination that the fit of article of PPE 13A to the body part or worker 10A does not satisfy the at least one safety requirement. For example, the at least one operation may include outputting an indication that article of PPE 13A is not positioned appropriately, such as through notification service 40F, display 12, or an audio device. As another example, the at least one operation may include outputting an indication to the wearer to adjust article of PPE 13A, such as through notification service 40F or display 12.

In some examples, PPE adjuster 40E may determine an adjustment of article of PPE 13A. For example, in response to receiving an indication that the fit of article of PPE 13A does not satisfy at least one of the various safety requirements, PPE adjuster 40E may determine an adjustment of article of PPE 13A on worker 10A. An adjustment of article of PPE 13A may include a change of position, a correct position, or any other difference in position of one or more components of article of PPE 13A that, if made, would cause the fit of article of PPE 13A to satisfy the at least one of the various safety requirements.

PPE adjuster 40E may receive a comparison of the visual features of two sets of wearer-specific image data. The comparison of the visual features may include various differences of visual features between the two sets of wearer-specific image data. PPE adjuster 40E may identify the differences of the various differences that do not satisfy the at least one safety requirement and determine an adjustment to reduce the differences so that the differences satisfy the at least one safety requirement. For example, PPE adjuster 40E may identify a difference in position between wearer-specific image data from a fit test and wearer-specific image data from a fit verification that exceeds a maximum threshold along a y-axis. PPE adjuster 40E may determine that an adjustment along the y-axis in an opposite direction that would reduce the difference in position below the maximum threshold.

In response to determining the adjustment to article of PPE 13A, PPE adjuster 40E may output an indication to worker 10A to adjust article of PPE 13A. In some examples, the indication to worker 10A to adjust article of PPE 13A may include a visual representation of the adjustment of article of PPE 13A to satisfy the at least one safety requirement. In some examples, the indication to worker 10A to adjust article of PPE 13A includes a visual indication of an adjustment that includes a difference between visual features of the two sets of wearer-specific image data.

In some cases, analytics service 40G performs in depth processing in real-time to provide real-time alerting and/or reporting. In this way, analytics service 40G may be configured as an active safety management system that provides real-time alerting and reporting to a safety manager, a supervisor, or the like in the case of PPE non-compliance of a worker 10. This may enable the safety manager and/or supervisor to intervene in the PPE non-compliance of the worker 10 such that worker 10 is not at risk for harm, injury, health complications, or combinations thereof due to a lack of PPE compliance.

In addition, analytics service 40G may include a decision support system that provides techniques for processing data to generate assertions in the form of statistics, conclusions, and/or recommendations. For example, analytics service 40G may apply historical data stored in image datastore 48C and/or PPE fit datastore 48D to determine the accuracy of the fit of one or more articles of PPE worn by worker 10A. In some such examples, analytics service 40G may calculate a confidence level relating to the fit accuracy of one or more articles of PPE worn by worker 10A. As one example, in the case in which lighting conditions of access point 14B may be reduced, the confidence level calculated by analytics service 40G may be lower than a confidence level calculated when lighting conditions are not reduced. If the calculated confidence level is less than or equal to a threshold confidence level, notification service 40F may present an alert on display 12 to notify worker 10A that the results of the PPE fit verification may not be completely accurate. Hence, analytics service 40G may maintain or otherwise use one or more models that provide statistical assessments of the accuracy of the identification and/or fit of the one or more articles of PPE required and/or worn by a worker. In one example approach, such models are stored in a model datastore 48E.

Analytics service 40G may also generate order sets, recommendations, and quality measures. In some examples, analytics service 40G may generate user interfaces based on processing information stored by PPEFS 6 to provide actionable information to any of clients 30. For example, analytics service 40G may generate dashboards, alert notifications, reports and the like for output at any of clients 30. Such information may provide various insights regarding baseline ("normal") PPE compliance across worker populations, identifications of any anomalous workers engaging in PPE non-compliance that may potentially expose the worker to risks, identifications of any of access points 14B exhibiting anomalous occurrences of PPE non-compliance relative to other environments, or the like.

Moreover, in addition to non-compliance, analytics service 40G may use in depth process to more accurately verify the identity and/or fit of the one or more articles of PPE. For example, although other technologies can be used, analytics service 40G may utilize machine learning when processing data in depth. That is, analytics service 40G may include executable code generated by application of machine learning to PPE identification, image processing, PPE fit verification, PPE compliance, or the like. The executable code may take the form of software instructions or rule sets and is generally referred to as a model that can subsequently be applied to data generated by or received by PPEFS 6 for detecting similar patterns, analyzing images, verifying the fit of one or more articles of PPE, or the like.

Analytics service 40G may, in some examples, generate separate models for each worker 10A, for a particular population of workers 10, for a particular access point 14, for a combination of one or more articles of PPE, for a type of PPE, for a brand, model, and/or size of PPE, for a specific job function, or for combinations thereof, and store the models in user datastore 48A, PPE fit datastore 48D, and/or model datastore 48E. Analytics service 40G may update the models based on PPE compliance data, images, and/or PPE verification. For example, analytics service 40G may update the models for each worker 10A, for a particular population of workers 10, for a particular access point 14, for a combination of one or more articles of PPE, for a type of PPE, for a brand, model, and/or size of PPE, for a specific job function, or for combinations thereof based on data received from image capture device 22, input devices 34, and/or any other component of PPEFS 6, and may store the updated models in user datastore 48A, PPE fit datastore 48D and/or model datastore 48E. Analytics service 40G may also update the models based on statistical analysis performed, such as the calculation of confidence intervals, and may store the updated models in user datastore 48A, PPE fit datastore 48D, and/or model datastore 48E.

Example machine learning techniques that may be employed to generate models can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms, or the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, Least-Angle Regression (LARS), Principal Component Analysis (PCA), and/or Principal Component Regression (PCR).

In some examples, analytics service 40G may provide comparative ratings of PPE fit and/or PPE compliance of workers 10. For example, analytics service 40G may "gamify" the PPE fit and/or PPE compliance of workers 10. In other words, in some cases, analytics service 40G may reward points to workers 10 for PPE fit and/or PPE compliance, which may increase worker morale and/or increase the desire of workers 10 to comply with PPE policies and regulations.

Record management and reporting service 40H processes and responds to messages and queries received from computing devices 32 via interface layer 36. For example, record management and reporting service 40H may receive requests from client computing devices for event data related to individual workers, populations or sample sets of workers, and/or access points 14. In response, record management and reporting service 40H accesses information based on the request. Upon retrieving the data, record management and reporting service 40H constructs an output response to the client application that initially requested the information. In some examples, the data may be included in a document, such as an HTML document, or the data may be encoded in a JSON format or presented by a dashboard application executing on the requesting client computing device.

As additional examples, record management and reporting service 40H may receive requests to find, analyze, and correlate PPE compliance information. For instance, record management and reporting service 40H may receive a query request from a client application for verified PPE stored in, for example, user datastore 48A over a historical time frame, such that a user can view PPE compliance information over a time and/or a computing device can analyze the PPE compliance information over time.

In some examples, services 40 may also include security service 40I that authenticates and authorizes users and requests with PPEFS 6. Specifically, security service 40I may receive authentication requests from client applications and/or other services 40 to access data in data layer 46 and/or perform processing in application layer 38. An authentication request may include credentials, such as a username and password. Security service 40I may query user datastore 48A to determine whether the username and password combination is valid. User datastore 48A may include security data in the form of authorization credentials, policies, and any other information for controlling access to PPEFS 6. As described above, user datastore 48A may include authorization credentials, such as combinations of valid usernames and passwords for authorized users of PPEFS 6. Other credentials may include device identifiers or device profiles that are allowed to access PPEFS 6.

Security service 40I may provide audit and logging functionality for operations performed at PPEFS 6. For instance, security service 40I may log operations performed by services 40 and/or data accessed by services 40 in data layer 46. Security service 40I may store audit information such as logged operations, accessed data, and rule processing results in audit datastore 48F. In some examples, security service 40I may generate events in response to one or more rules being satisfied. Security service 40I may store data indicating the events in audit datastore 48F.

Although generally described herein as user data, PPE data, image data, fit data, or any other stored information described herein being stored in datastores 48, in some examples, datastores 48 may additionally or alternatively include data representing such user data, PPE data, image data, fit data, or any other stored information described herein. As one example, encoded lists, vectors, or the like representing a previously stored image may be stored in addition to, or as an alternative, the previously stored image itself. In some examples, such data representing user data, PPE data, image data, model data, fit data, or any other stored information described herein may be simpler to store, evaluate, organize, categorize, or the like in comparison to storage of the actual user data, PPE data, model data, image data, fit data, or the like.

In general, while certain techniques or functions are described herein as being performed by certain components or modules, it should be understood that the techniques of this disclosure are not limited in this way. That is, certain techniques described herein may be performed by one or more of the components or modules of the described systems. Determinations regarding which components are responsible for performing techniques may be based, for example, on processing costs, financial costs, power consumption, or the like.

Figure 3A:
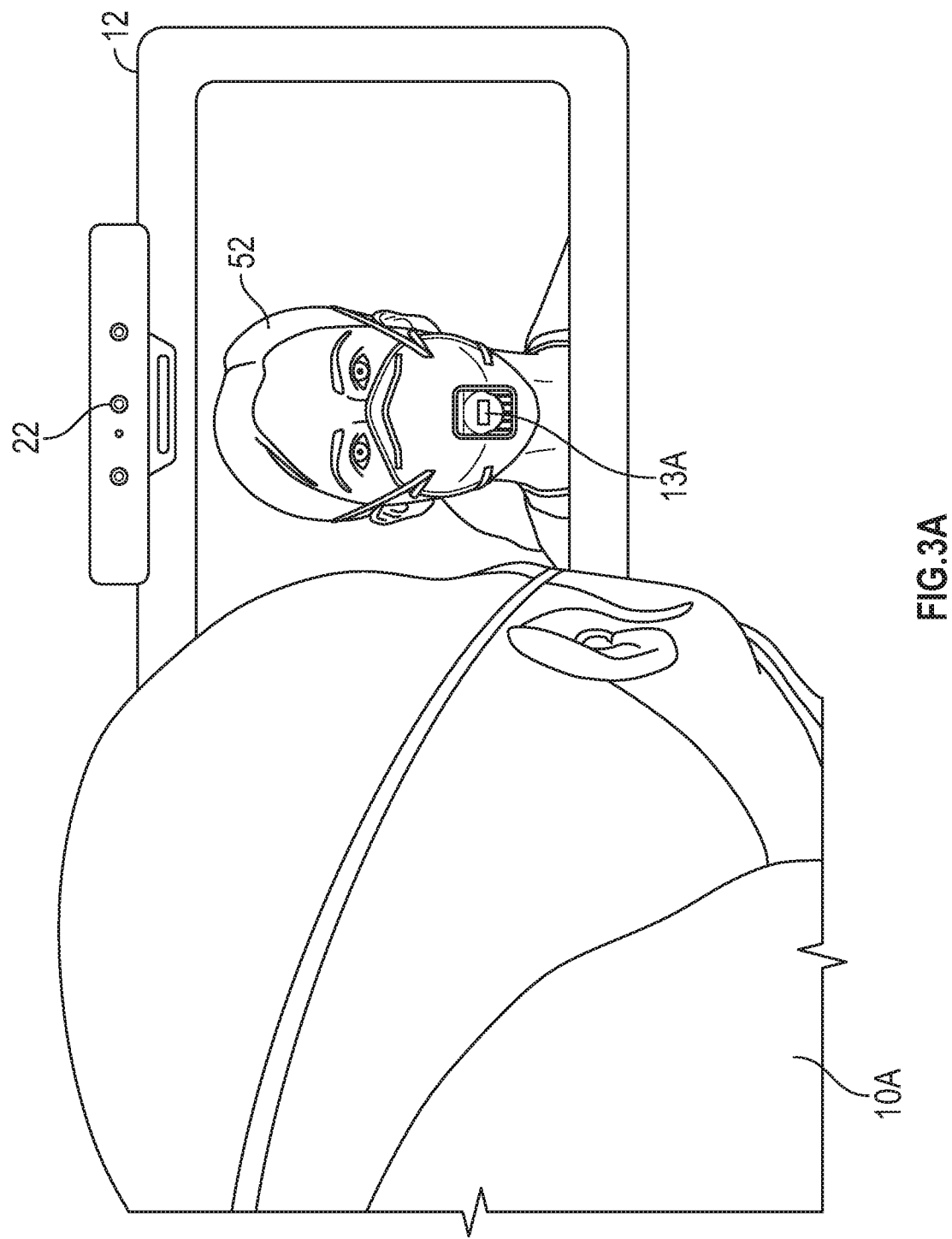
FIG. 3A is a diagram illustrating an example fit verification system for fit verification of one or more articles of PPE worn by a worker.

FIG. 3A is a diagram illustrating an example fit verification system for fit verification of an article of PPE 13A worn by a worker 10A. The fit verification system includes display 12 and image capture device 22. As shown in the example of FIG. 3A, display 12 is indicating a visual representation 52 of worker 10A wearing article of PPE 13A.

Figure 3B:
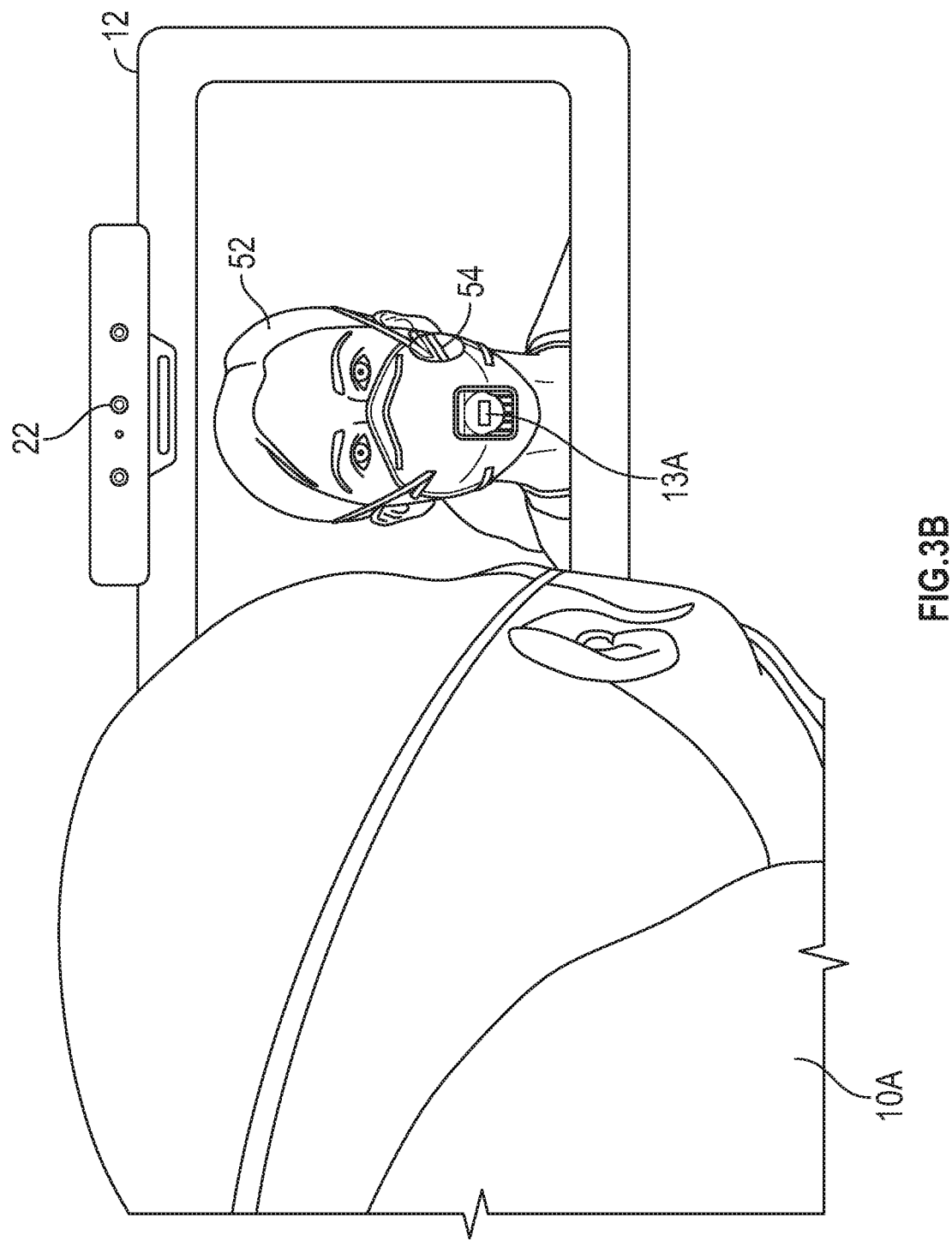
FIG. 3B is a diagram illustrating an example fit verification system indicating a difference in fit of a respirator.

FIG. 3B is a diagram illustrating an example fit verification system indicating a difference in fit of an article of PPE 13A. As shown in FIG. 3B, display 12 outputs visual representation 52 of worker 10A wearing article of PPE 13A. In the example of FIG. 3B, display 12 is indicating a difference in fit of article of PPE 13A. For example, PPEFS 6 may determine that article of PPE 13A does not satisfy a safety requirement. PPEFS 6 may indicate to worker 10A a portion 54 of article of PPE 13A that does not satisfy the safety requirement. In the example of FIG. 3B, portion 54 is indicated on display 12, such as by highlighting portion 54. In response to viewing the indication that portion 54 does not satisfy the safety requirement, worker 10A may adjust portion 54 of article of PPE 13A until worker 10A no longer receives the indication that article of PPE 13A does not satisfy the safety requirement.

Figure 3C:
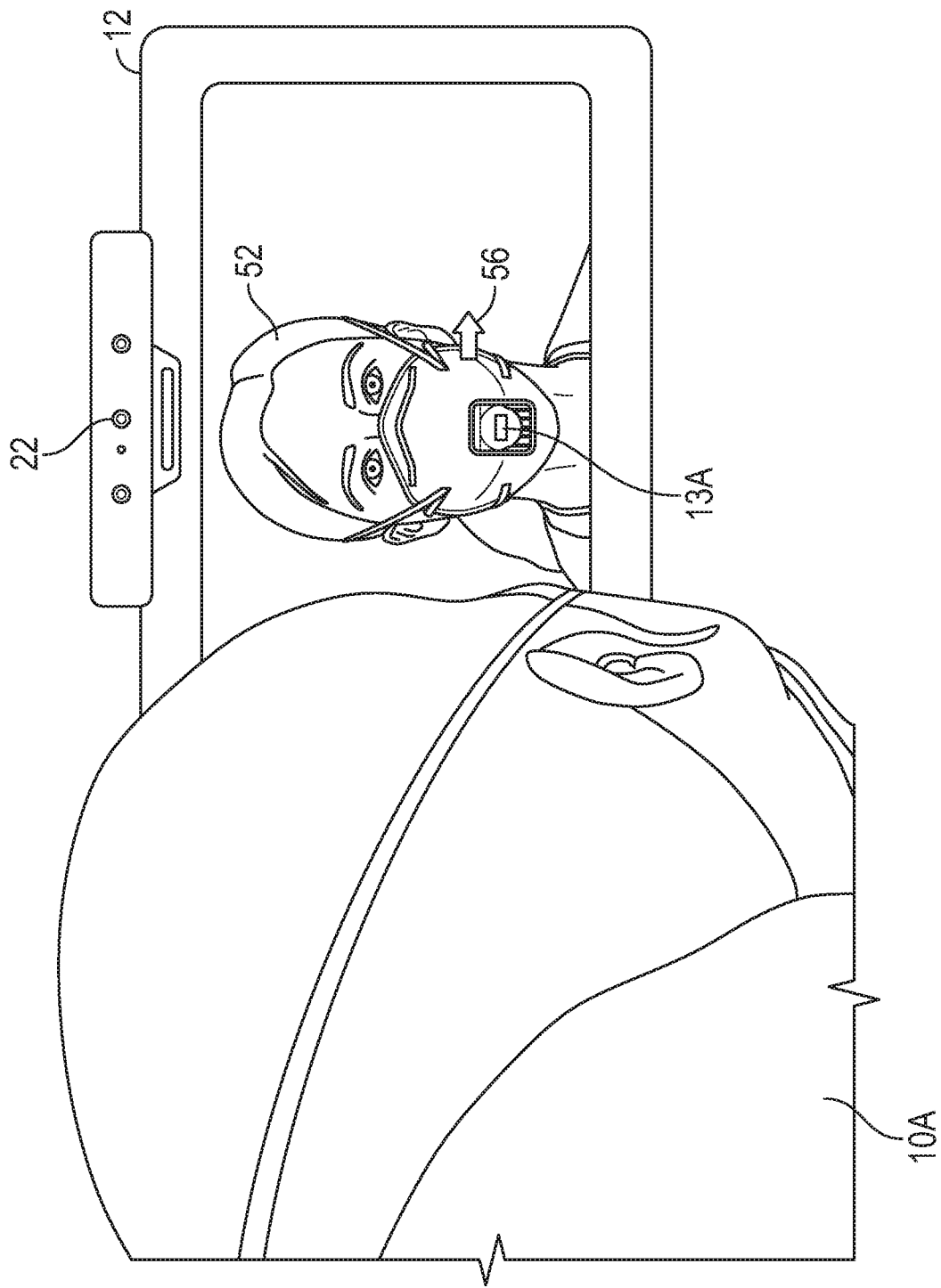
FIG. 3C is a diagram illustrating an example fit verification system indicating an adjustment in fit of a respirator.

FIG. 3C is a diagram illustrating an example fit verification system indicating an adjustment in fit of an article of PPE 13A. As shown in FIG. 3C, display 12 outputs visual representation 52 of worker 10A wearing article of PPE 13A. In the example of FIG. 3C, display 12 is indicating a specific adjustment in fit of article of PPE 13A. For example, PPEFS 6 may determine that article of PPE 13A does not satisfy a safety requirement. PPEFS 6 may indicate to worker 10A a direction 56 to reposition article of PPE 13A to satisfy the safety requirement. In response to viewing the indication of direction 56, worker 10A may adjust article of PPE 13A according to direction 56 until worker 10A no longer receives the indication that article of PPE 13A does not satisfy the safety requirement.

Figure 3D:
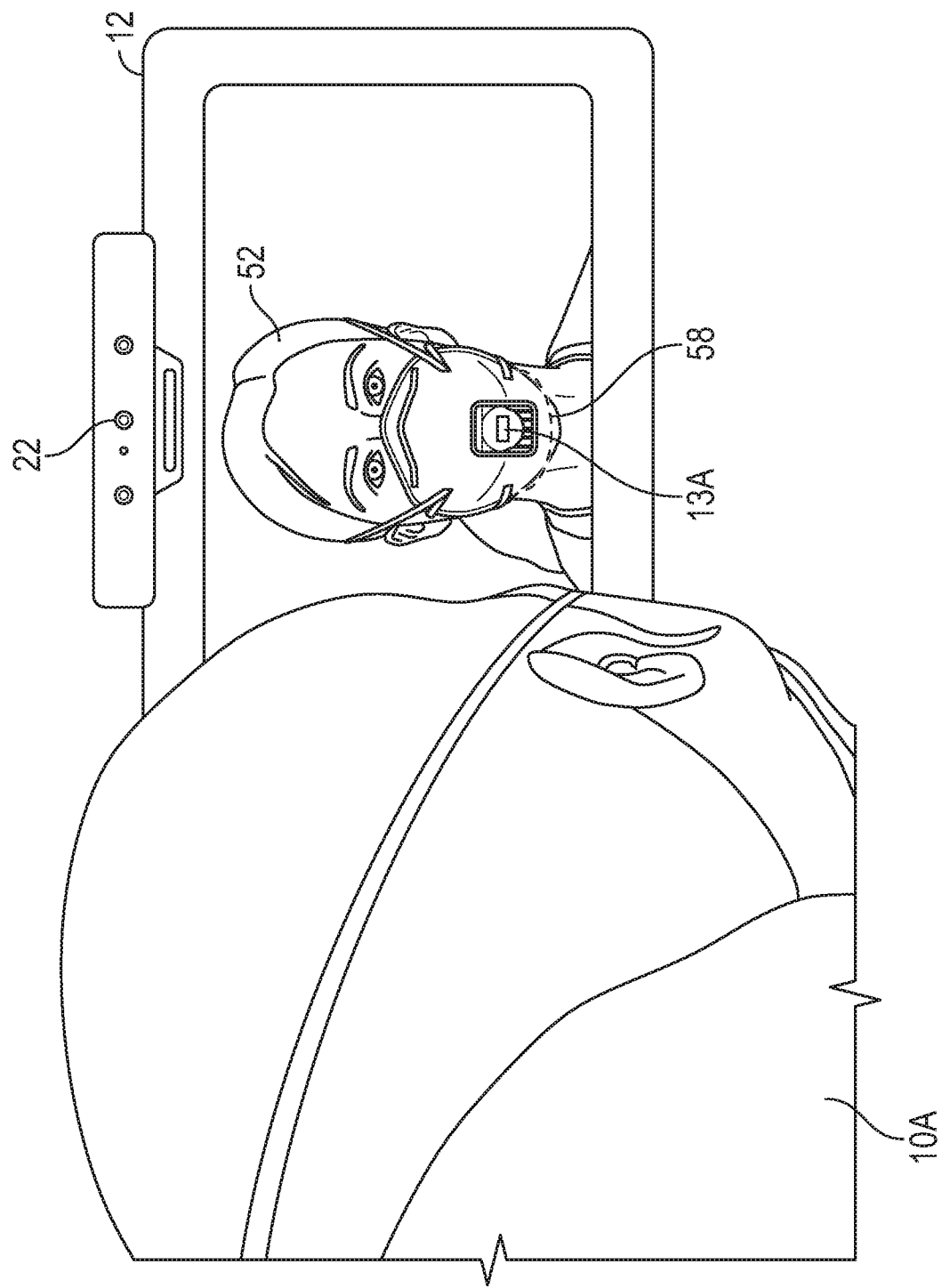
FIG. 3D is a diagram illustrating an example fit verification system indicating a desired fit of a respirator.

FIG. 3D is a diagram illustrating an example fit verification system indicating a desired fit of article of PPE 13A. As shown in FIG. 3D, display 12 outputs visual representation 52 of worker 10A wearing article of PPE 13A. In the example of FIG. 3D, display 12 is indicating a desired fit of article of PPE 13A. For example, PPEFS 6 may determine that article of PPE 13A does not satisfy a safety requirement. PPEFS 6 may indicate to worker 10A a position 58 of article of PPE 13A that satisfies the safety requirement. In response to viewing the indication of position 58, worker 10A may adjust article of PPE 13A to match position 58 until worker 10A no longer receives the indication that article of PPE 13A does not satisfy the safety requirement.

Figure 4:
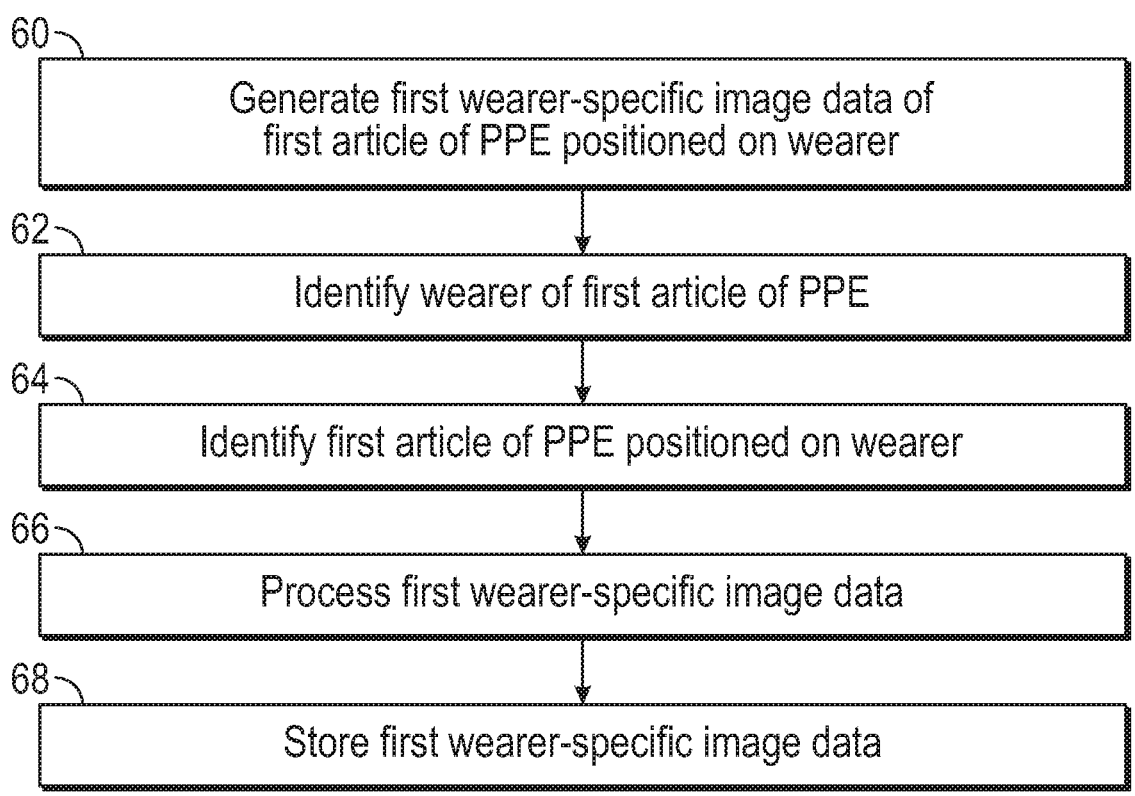
FIG. 4 is a flow diagram illustrating an example technique for a fit test for one or more articles of PPE worn by a worker, according to aspects of this disclosure.

FIG. 4 is a flow diagram illustrating an example technique for fit testing of one or more articles of PPE worn by a worker, according to aspects of this disclosure.

FIG. 4 is a flow diagram illustrating an example technique for verifying a fit of one or more articles of PPE worn by a worker, according to aspects of this disclosure. The technique of FIG. 4 will be described with respect to computing system 2 of FIG. 1 and PPEFS 6 of FIG. 2. In other examples, however, the technique of FIG. 4 may be used with additional or alternative systems other than computing system 2 and/or PPEFS 6.

The technique of FIG. 4 includes generating first wearer-specific image data of a first article of PPE on a wearer, such as worker 10A (60). In some examples, image capture device 22 or another image capture device may generate the first wearer-specific image data of the first article of PPE positioned on worker 10A.

The technique further includes identifying, by user identifier 40A, a person wearing the first article of PPE (62). For example, worker 10A may scan a user ID which may be associated with an identifier. Wearer-specific image data generated during the fit test may be associated with the identifier wearer of the article of PPE. The technique further includes identifying, by PPE identifier 40B, the first article of PPE positioned on worker 10A (64). For example, PPE identifier 40B may identify article of PPE 13A based on a reference marker of article of PPE 13A, various physical characteristics of article of PPE 13A, user input identifying article of PPE 13A, and the like. Wearer-specific image data generated during the fit test may be associated with the identified article of PPE, such as a type of the article of PPE.

The technique further includes processing, by image processor 40C, the first wearer-specific image data of the first article of PPE positioned on worker 10A (66). For example, image processor 40C may perform a variety of image processing techniques to identify visual features of the first wearer-specific image data, such as difference component analysis. In some examples, image processor 40C may parameterize the identified visual features of the first wearer-specific image data.

The technique further includes storing, by image processor 40C, the first wearer-specific image data, such as in image datastore 48C or a centralized server (68). For example, image processor 40C may associate the image data with the identified wearer of the article of PPE and the identified type of the article of PPE. The stored wearer-specific image data may visually represent a fit of the article of PPE on the wearer that satisfies a safety requirement. The visually represented fit may be unique to the wearer and may have a higher accuracy of fit than other fit systems that do not use wearer-specific image data.

Figure 5:
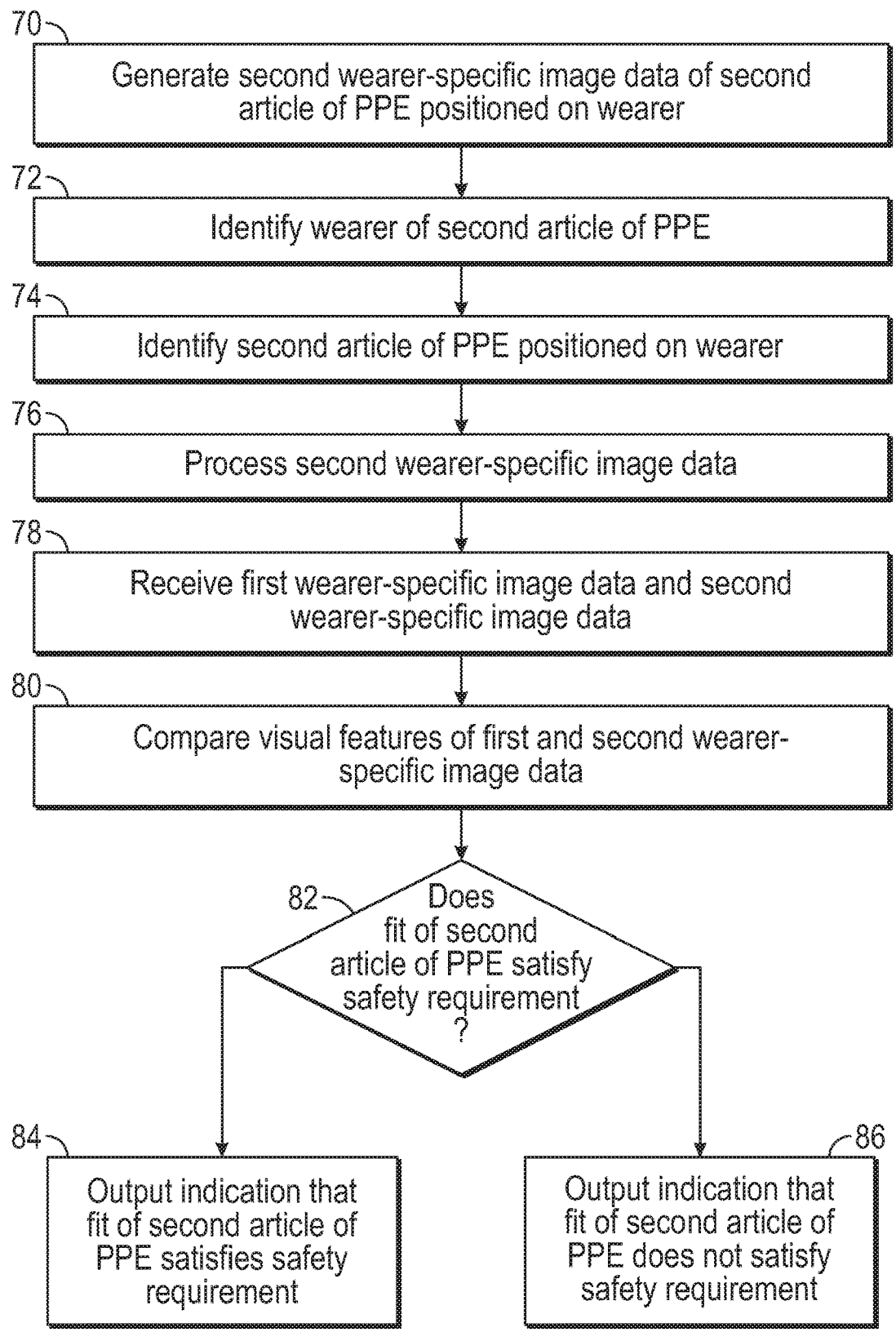
FIG. 5 is a flow diagram illustrating an example technique for a fit verification for one or more articles of PPE worn by a worker, according to aspects of this disclosure.

FIG. 5 is a flow diagram illustrating an example technique for fit verification of one or more articles of PPE worn by a worker, according to aspects of this disclosure. The technique of FIG. 5 will be described with respect to computing system 2 of FIG. 1, PPEFS 6 of FIG. 2, and the technique of FIG. 4. In other examples, however, the technique of FIG. 5 may be used with additional or alternative systems other than computing system 2 and/or PPEFS 6. As described in FIG. 4 above, PPEFS 6 may generate, process, and/or store first wearer-specific image data during a fit test that visually represents a fit that satisfies one or more safety requirements. In the technique of FIG. 5, PPEFS 6 may use the fist wearer-specific image data from the fit test to verify of fit of the same type of article of PPE.

The technique of FIG. 4 includes generating second wearer-specific image data of a second article of PPE on a wearer, such as worker 10A (70). In some examples, image capture device 22 or another image capture device may generate the second wearer-specific image data of the second article of PPE positioned on worker 10A.

The technique further includes identifying, by user identifier 40A, worker 10A wearing the second article of PPE (72). For example, worker 10A may scan a user ID which may be associated with an identifier. Wearer-specific image data generated during the fit test may be associated with the identifier wearer of the article of PPE.

The technique further includes identifying, by PPE identifier 40B, the second article of PPE positioned on worker 10A (74). For example, PPE identifier 40B may identify article of PPE 13A based on a reference marker of article of PPE 13A, various physical characteristics of article of PPE 13A, user input identifying article of PPE 13A, and the like. Wearer-specific image data generated during the fit verification may be associated with the identified article of PPE, such as a type of the article of PPE.

The technique further includes processing, by image processor 40C, the second wearer-specific image data of the second article of PPE positioned on worker 10A (76). For example, image processor 40C may perform a variety of image processing techniques to identify visual features of the second wearer-specific image data. In some examples, image processor 40C may parameterize the identified visual features of the second wearer-specific image data.

The technique further includes receiving, by PPE fit verifier 40D, first wearer-specific image data and second wearer-specific image data (78). For example, PPE fit verifier 40D may use an identify of worker 10A and an identity of article of PPE 13A to retrieve, such as from image datastore 48C, the first wearer-specific image data associated with the fit test for worker 10A and article of PPE 13A. As another example, PPE fit verifier 40D may receive the second wearer-specific image data from image processor 40C.

The technique further includes comparing, by PPE fit verifier 40D, visual features of the first and second wearer-specific image data (80). For example, PPE fit verifier 40D may identify one or more differences between visual features of the first and second wearer-specific image data. The one or more differences may represent deviations in a fit of the second article of PPE in the fit verification from the fit of the first article of PPE in the fit test.

The technique further includes determining, by PPE fit verifier 40D, whether the fit of the second article of PPE satisfies a safety requirement based on the comparison of the visual features of the first and second wearer-specific image data (82). For example, PPE fit verifier 40D may compare the one or more differences between visual features of the first and second wearer-specific image data to a threshold that represents a maximum deviation from a fit of the first PPE that satisfies the safety requirement.

In some instances, the technique further includes outputting, by PPE fit verifier 40D and in response to determining that the fit of the second article of PPE satisfies the safety requirement, an indication that the fit of the second article of PPE satisfies the safety requirement (84). For example, PPE fit verifier 40D may determine that the differences between the one or more visual features of the first and second wearer-specific image data do not exceed the threshold representing the safety requirement. In response to this determination, PPE fit verifier 40D may output an indication, such as a confirmation, to notification service 40F that the fit of the second article of PPE satisfies the safety requirement and that, for example, worker 10A may enter environment 8.

In some instances, the technique further includes outputting, in response to determining that the fit of the second article of PPE does not satisfy the safety requirement, an indication that the fit of the second article of PPE does not satisfy the safety requirement (86). For example, PPE fit verifier 40D may determine that the differences between the one or more visual features of the first and second wearer-specific image data exceed the threshold representing the safety requirement. In response to this determination, PPE fit verifier 40D may output an indication, such as a warning, alert, visualization, or adjustment, to notification service 40F that the fit of the second article of PPE does not satisfy the safety requirement.

In some examples, the technique of FIG. 5 further includes determining an adjustment of the second article of PPE based on the difference between visual features of the first and second wearer-specific image data. The adjustment may be configured such that the wearer, following the adjustment, may reposition the second article of PPE on the body part of worker 10A such that the fit of the second article of PPE satisfies the safety requirements. In some examples, the indication to worker 10A to adjust the second article of PPE includes a visual representation of the adjustment to the second article of PPE to satisfy the at least one safety requirement.

[FIG. 6]

Figure 6A:
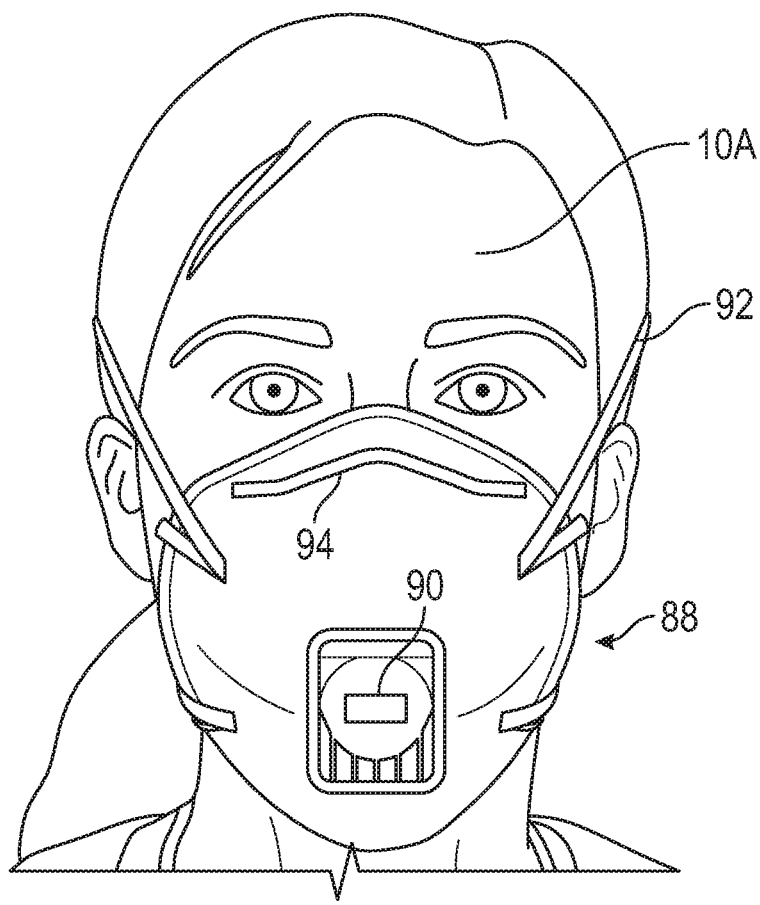
FIG. 6A is a diagram illustrating an example respirator worn by a worker.

FIG. 6A is a diagram illustrating an example respirator 88 worn by worker 10A. Respirator 88 includes a marker 90, straps 92, and a nose clip 94. While FIG. 6A will be described with respect to respirator 88, a variety of types of articles of PPE may include features as will be discussed below. In some examples, an article of PPE, such as respirator 88, may include various reference markers coupled to the article of PPE and detectable by an image capture device, such as image capture device 22 of FIGS. 1 and 2. The reference marker may be used to determine a fit of the PPE on a particular wearer.

In some examples, a reference marker may act as a reference between two sets of wearer-specific image data. For example, marker 90 may include a unique identifier, such as a logo, embedded code, or other marker detectable by image capture device 22. A type of article of PPE may include marker 90, such that each of the wearer-specific image data from a fit test and verification test of worker 10A wearing respirator 88 may include marker 90 or a marker that includes a same detectable code as marker 90. Once identified, such as by PPEFS 6, marker 90 may act as a reference point for each of the wearer-specific image data. In some example, PPEFS 6 may use properties of marker 90, such as a position or orientation of marker 90, as visual features with which to perform a comparison of wearer-specific image data of the fit test and fit verification. In some examples, PPEFS 6 may use marker 90 as a common reference to identify other visual features with which to perform a comparison of wearer-specific image data of the fit test and fit verification.

In some examples, a reference marker may indicate fit information through properties of the reference marker. For example, straps 92 and/or nose clip 94 may include materials that indicate visual features by changes properties, such as color or reflectivity, based on fit. As an example, strap 92 may include a material, such as a coating or polymer, changes color based on a tension of straps 92. PPEFS 6 may identify the color of straps 92 and determine whether the color of straps 92 in wearer-specific image data for a fit verification matches a color of straps 92 in wearer-specific image data for a fit test. If a difference in colors exceed a threshold, such as a difference in wavelengths, PPEFS 6 may determine that the straps are, for example, too tight or too loose and thus do not satisfy a safety requirement.

In some examples, the reference marker may include a multilayer reflective film configured to reflect light at a spectral shift corresponding to an angle of incidence of the light. A plurality of layers of the multilayer reflective film may have different refractive indices to create the spectral shift. Due to the ability of the reflective film to reflect light differently at different angles of incidence, the reflective film may be coupled to a portion of the PPE configured to fit against the particular wearer at a curvature. For example, the multilayer reflective film may be attached to an outer surface of an article of PPE, such as respirator 88 of FIG. 6A. In the example of FIG. 6A, for example, the multilayer reflective film may be coupled to nose clip 94.

Figure 6B:
FIG. 6B is a diagram illustrating a flat nose clip that includes a multilayer reflective film configured to reflect light at a spectral shift.

FIG. 6B is a diagram illustrating a flat nose clip 94 that includes a multilayer reflective film configured to reflect light at a spectral shift. In the example of FIG. 6B, nose clip 94 is unshaped and has a surface that comprises a planar portion 96. As such, nose clip 94 does not include a substantially angular surface to reflect light at various wavelengths, with the result that nose clip 94 has a substantially uniform color.

Figure 6C:
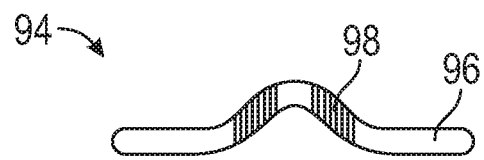
FIG. 6C is a diagram illustrating a bent nose clip that includes a multilayer reflective film configured to reflect light at a spectral shift.

FIG. 6C is a diagram illustrating a bent nose clip 94 that includes a multilayer reflective film configured to reflect light at a spectral shift. In the example of FIG. 6C, nose clip 94 is shaped and has a surface that comprises the planar portion 96 and a bent portion 98. Bent portion 98 creates an angular surface, such that bent portion 98 reflects light at different wavelengths than planar portion 96. As such, nose clip 94 may have a unique color signature associated with a bent profile of nose clip 94. For example, PPEFS 6 may compare a color signature from wearer-specific image data during a fit test to a color signature from wearer-specific image data during a fit verification. Based on the difference in the color signatures of the fit test and fit verification, PPEFS 6 may determine whether the fit of nose clip 94 during the fit verification meets the safety requirements.

While the multilayer reflective film has been described with respect to nose clip 94, the multilayer reflective film may be used on a variety of articles of PPE for which a curvature may indicate a fit. For example, the multilayer reflective film may be used on a surface of hearing protection devices such that a difference in orientation of the hearing protection device within the ear of worker 10A may be determined between wearer-specific image data from a fit test and a fit verification.

As explained above, PPEFS 6 may identify one or more visual features of wearer-specific image data that represents an article of PPE, such as respirator 88 of FIG. 6A, positioned on worker 10A and compare the one or more visual features of the wearer-specific image data. PPEFS 6 may determine whether a difference between the visual features is greater than a threshold and, in response to determining that the difference is greater than the threshold, outputting an indication that the article of PPE is not positioned appropriately.

In some examples, the one or more visual features may include a position of marker 90 on respirator 88. For example, marker 90 may be a reference to respirator 88, and a position of marker 90 may indicate a position of respirator 88 on the face of worker 10A, which may correspond to a particular area of coverage of the respirator associated with a safety requirement. In this example, PPEFS 6 may compare a first position of marker 90 on the first article of PPE to a second position of a second marker on the second article of PPE. PPEFS 6 may determine that a difference between the first position and the second position is greater than a threshold. In response to determining that the difference is greater than the threshold, PPEFS 6 may output an indication that the second article of PPE is not positioned appropriately In some examples, the one or more visual features may include a position of respirator 88 on the face of worker 10A. For example, the position of respirator 88 on the face of worker 10A may correspond to a particular area of coverage of respirator 88. In this example, PPEFS 6 may compare a first position of the first article of PPE on the body part of the particular wearer to a second position of the second article of PPE on the body part of the particular wearer. PPEFS 6 may determine that a difference between the first position and the second position is greater than a threshold. In response to determining that the difference is greater than the threshold, PPEFS 6 may output an indication that the second article of PPE is not positioned appropriately In some examples, the one or more visual features may include nose clip curvature of respirator 88, such as a spectral profile of nose clip 94 as described in FIGS. 6B and 6C above. For example, a nose clip curvature of respirator 88 may indicate a tightness of respirator 88 around the nose and/or upper cheeks of worker 10A. In this example, PPEFS 6 may compare a first nose clip curvature, such as indicated by a first spectral profile, of the first respirator on the face of the particular wearer to a second nose clip curvature, such as indicated by a second spectral profile, of the second respirator on the face of the particular wearer. PPEFS 6 may determine that a difference between the first position and the second position is greater than a threshold. In response to determining that the difference is greater than the threshold, PPEFS 6 may output an indication that a nose clip of the second respirator is not positioned appropriately.

In some examples, the one or more visual features may include a contour of respirator 88. For example, the contour of respirator 88 may indicate a tightness of respirator 88 to the face of worker 10A. In this example, PPEFS 6 may compare a first contour of the first respirator on the face of the particular wearer to a second contour of the second respirator on the face of the particular wearer. PPEFS 6 may determine that a difference between the first contour and the second contour is greater than a threshold. In response to determining that the difference is greater than the threshold, PPEFS 6 may output an indication that the second respirator is not tightened appropriately.

In some examples, the one or more visual features may include a tightness of straps 92 of respirator 88. For example, the tightness of straps 92 of respirator 88 may indicate a tightness of respirator 88 to the face of worker 10A. In this example, PPEFS 6 may compare a first tightness of the straps of the first respirator on the face of the particular wearer to a second tightness of the straps of the second respirator on the face of the particular wearer. For example, PPEFS 6 may compare at least one of magnitude of tension of the first straps and the second straps and a uniformity of the first straps and the second straps. As another example, the first straps of the first respirator and the second straps of the second respirator each comprise elastic having indicator objects configured to deform in response to stretching. PPEFS 6 may compare a shape of the indicator objects. PPEFS 6 may determine that a difference between the first tightness and the second tightness is greater than a threshold. In response to determining that the difference is greater than the threshold, PPEFS 6 may output an indication that the second respirator is not tightened appropriately.

In some examples, the one or more visual features may include a position of straps 92 of respirator 88. For example, a position of the straps of the respirator may indicate a position of respirator 88 or potential for respirator 88 to move or come off the face of worker 10A. In this example, PPEFS 6 may compare a first position of first straps of the first respirator on the face of the particular wearer to a second position of second straps of the second respirator on the face of the particular wearer. PPEFS 6 may determine that a difference between the first position and the second position is greater than a threshold. In response to determining that the difference is greater than the threshold, PPEFS 6 may output an indication that the second straps are not positioned correctly.

While FIGS. 6A-C has been described with respect to visual features of a respirator, a wide variety of visual features may be analyzed with a wide variety of articles of PPE. Articles of PPE may include, but are not limited to, a breathing protection device, a fall-protection device, a hearing protection device, an eye protection device, and a head protection device.

For example, with respect to fall protection devices, PPEFS 6 may evaluate tightness of straps of the fall protection device, position of the fall protection device, and the like. As another example, with respect to hearing protection devices, PPEFS 6 may evaluate position of ear muffs over an ear, tightness of head strap to the head of a wearer, and the like.

Although the methods and systems of the present disclosure have been described with reference to specific examples, those of ordinary skill in the art will readily appreciate that changes and modifications may be made thereto without departing from the spirit and scope of the present disclosure.

In the present detailed description, reference is made to the accompanying drawings, which illustrate specific examples. The illustrated examples are not intended to be exhaustive of all examples according to the disclosure. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass examples having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example.

The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor or processing circuitry to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A system comprising:
an image capture device; and
a computing device communicatively coupled to the image capture device, the computing device comprising one or more computer processors and a memory, the memory including instructions that when executed by the one or more computer processors cause the one or more computer processors to:
retrieve, from the memory, first wearer-specific image data, the first wearer-specific image data comprising a visual representation of a first article of PPE positioned on a particular wearer in a way that satisfies at least one safety requirement, wherein the first article of PPE comprises a respirator;
receive, from the image capture device, second wearer-specific image data, the second wearer-specific image data comprising a visual representation of a second article of PPE positioned on the particular wearer, the second article of PPE of a same type of personal protection as the first article of PPE, wherein the second article of PPE comprises a respirator;
compare, by applying a machine-learning algorithm executed on the one or more computer processors, to data indicative of one or more visual features of the second wearer-specific image data to one or more visual features of the first wearer-specific image data, wherein at least one of the visual features includes a first contour of the first article of PPE and a second contour from the second article of PPE;
determine, using the algorithm executed on the one or more computer processors, based on the comparison of the one or more visual features of the second wearer-specific image data to the one or more visual features of the first wearer-specific image data, whether the second article of PPE satisfies the at least one safety requirement based on whether a difference between the first contour and the second contour is greater than a threshold; and
output an indication that the second article of PPE is not tightened appropriately and whether the second article of PPE satisfies the at least one safety requirement.

2. The system of claim 1, wherein, to determine whether the second article of PPE satisfies the at least one safety requirement, the instructions further cause the one or more computer processors to:
identify a difference between the one or more visual features of the second wearer-specific image data and the one or more visual features of the first wearer-specific image data;
determine whether the difference between the one or more visual features of the second wearer-specific image data and the one or more visual features of the first wearer-specific image data exceeds a threshold representing the fit of the first article of PPE that satisfies the at least one safety requirement.

3. The system of claim 1, wherein the first wearer-specific image data comprises a first set of parameters that represent the one or more visual features of the first wearer-specific image data, the second wearer-specific image data comprises a second set of parameters that represent the one or more visual features of the second wearer-specific image data, and wherein, to determine whether the second article of PPE satisfies the at least one safety requirement, the instructions further cause the one or more computer processors to:
identify a difference between the first set of parameters and the second set of parameters; and
determine whether the difference between the first set of parameters and the second set of parameters exceeds a threshold representing the fit of the first article of PPE that satisfies the at least one safety requirement.

4. The system of claim 3, wherein the instructions further cause the one or more computer processors to:
retrieve, based on the one or more visual features of the first wearer-specific image data, the first set of parameters; and
retrieve, based on the one or more visual features of the second wearer-specific image data, the second set of parameters.

5. The system of claim 1, wherein the instructions further cause the one or more computer processors to:

retrieve, from the memory, third wearer-specific image data, the third wearer-specific image data comprising a visual representation of a body part of the particular wearer at a first time;

receive, from the image capture device, fourth wearer-specific image data, the fourth wearer-specific image data comprising a visual representation of the body part of the particular wearer at a second time, later than the first time;

compare one or more visual features of the fourth wearer-specific image data to one or more visual features of the third wearer-specific image data; and determine, based on the comparison of one or more visual features of the fourth wearer-specific image data to the third wearer-specific image data, whether the first wearer-specific image data should be updated; and output an indication of whether the first wearer-specific image data should be updated.

6. The system of claim 1, wherein the instructions further cause the one or more computer processors to:

compare a first position of a first marker on the first article of PPE to a second position of a second marker on the second article of PPE; and determine that a difference between the first position and the second position is greater than a threshold.

7. The system of claim 1, wherein the instructions further cause the one or more computer processors to:

compare a first position of the first article of PPE on the body part of the particular wearer to a second position of the second article of PPE on the body part of the particular wearer; and determine that a difference between the first position and the second position is greater than a threshold.

8. A computing device for determining a fit test communicatively coupled to an image capture device, and comprising one or more computer processors and a memory with instructions that when executed by the one or more computer processors cause the one or more computer processors to:

retrieve, from the memory, first wearer-specific image data, the first wearer-specific image data comprising a visual representation of a first article of PPE positioned on a particular wearer in a way that satisfies at least one safety requirement, the first article of PPE comprising a respirator, and the first wearer-specific image data comprising a first contour of the first article of PPE;

receive, from the image capture device, second wearer-specific image data, the second wearer-specific image data comprising a visual representation of a second article of PPE positioned on the particular wearer, the second article of PPE of a same type of personal protection as the first article of PPE, the second article of PPE comprising a respirator, and the second wearer-specific image data comprising a second contour of the second article of PPE;

applying a machine learning algorithm to apply a model to compare visual features associated with the second contour to visual features associated with the first contour;

determine, based on the comparison of the one or more visual features associated with the second contour to the one or more visual features associated with the first contour, whether the second article of PPE satisfies the at least one safety requirement based on whether a difference between the first contour and the second contour is greater than a threshold; and output an indication that the second article of PPE is not tightened appropriately and whether the second article of PPE satisfies the at least one safety requirement.

9. The computing device of claim 8, wherein, to determine whether the second article of PPE satisfies the at least one safety requirement, the instructions further cause the one or more computer processors to:

identify a difference between the one or more visual features of the second wearer-specific image data and the one or more visual features of the first wearer-specific image data;

determine whether the difference between the one or more visual features of the second wearer-specific image data and the one or more visual features of the first wearer-specific image data exceeds a threshold representing the fit of the first article of PPE that satisfies the at least one safety requirement.

10. The computing device of claim 8, wherein the first wearer-specific image data comprises a first set of parameters that represent the one or more visual features of the first wearer-specific image data, the second wearer-specific image data comprises a second set of parameters that represent the one or more visual features of the second wearer-specific image data, and wherein, to determine whether the second article of PPE satisfies the at least one safety requirement, the instructions further cause the one or more computer processors to:

identify a difference between the first set of parameters and the second set of parameters; and determine whether the difference between the first set of parameters and the second set of parameters exceeds a threshold representing the fit of the first article of PPE that satisfies the at least one safety requirement.

11. The computing device of claim 10, wherein the instructions further cause the one or more computer processors to:

retrieve, based on the one or more visual features of the first wearer-specific image data, the first set of parameters; and retrieve, based on the one or more visual features of the second wearer-specific image data, the second set of parameters.

12. The computing device of claim 8, wherein the instructions further cause the one or more computer processors to:

retrieve, from the memory, third wearer-specific image data, the third wearer-specific image data comprising a visual representation of a body part of the particular wearer at a first time;

receive, from the image capture device, fourth wearer-specific image data, the fourth wearer-specific image data comprising a visual representation of the body part of the particular wearer at a second time, later than the first time;

compare one or more visual features of the fourth wearer-specific image data to one or more visual features of the third wearer-specific image data; and determine, based on the comparison of one or more visual features of the fourth wearer-specific image data to the third wearer-specific image data, whether the first wearer-specific image data should be updated; and output an indication of whether the first wearer-specific image data should be updated.

* * * * *